United States Patent
Song et al.

(10) Patent No.: US 10,537,999 B2
(45) Date of Patent: Jan. 21, 2020

(54) MULTI-DEGREE OF FREEDOM TORQUE-FREE LINKAGE UNIT

(71) Applicant: KOREA UNIVERSITY RESEARCH AND BUSINESS FOUNDATION, Seoul (KR)

(72) Inventors: Jae Bok Song, Seoul (KR); Hwi Su Kim, Seoul (KR); Jae Kyung Min, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 944 days.

(21) Appl. No.: 15/031,596

(22) PCT Filed: Oct. 21, 2014

(86) PCT No.: PCT/KR2014/009909
§ 371 (c)(1),
(2) Date: Aug. 3, 2016

(87) PCT Pub. No.: WO2015/060626
PCT Pub. Date: Apr. 30, 2015

(65) Prior Publication Data
US 2016/0332312 A1    Nov. 17, 2016

(30) Foreign Application Priority Data
Oct. 22, 2013 (KR) .................. 10-2013-0126149
Sep. 25, 2014 (KR) .................. 10-2014-0128451

(51) Int. Cl.
*B25J 19/00* (2006.01)
*B25J 9/06* (2006.01)

(52) U.S. Cl.
CPC ............. *B25J 19/0016* (2013.01); *B25J 9/06* (2013.01)

(58) Field of Classification Search
CPC .................. B25J 19/0016; B25J 9/06
See application file for complete search history.

(56) References Cited

U.S. PATENT DOCUMENTS 4,756,204 A * 7/1988 Wittwer ............ B25J 19/0016
16/401
5,046,375 A 9/1991 Salisbury, Jr. et al.
(Continued)

FOREIGN PATENT DOCUMENTS

JP 2003-181789 A 7/2003
KR 10-1994-0006726 A 4/1994
(Continued)

OTHER PUBLICATIONS

Changhyun Cho et al., "Design of a 2-dofs Manipulator with gravity compensators", Fall Conference and Journal of The Korean Society of Mechanical Engineers, pp. 1409-1413, Nov. 3, 2010.
(Continued)

*Primary Examiner* — Vicky A Johnson
(74) *Attorney, Agent, or Firm* — Rabin & Berdo, P.C.

(57) ABSTRACT

The present invention provides a multi-degree of freedom torque-free linkage unit comprising: a root link; a base link; and a first link spaced from a first joint, and comprises a counterbalancer including a first counterbalancer which enables gravity compensation of the first link, and a curved parallelogram unit comprising: a base part location-fixed and arranged at the root link; a first base part rotatably provided to the base link and the first joint formed by the first link, and connected to the first counterbalancer; and a parallelogram transfer part for connecting the base part and the first base part and forming a reference position for gravity compensation of another link connected to the base link by rotating the first base part on the first joint when the base link moves relatively with respect to the root link.

20 Claims, 32 Drawing Sheets

(56) References Cited

U.S. PATENT DOCUMENTS

| | | | |
|---|---|---|---|
| 6,253,458 B1 * | 7/2001 | Raab | G01B 5/0016 33/1 N |
| 6,298,569 B1 | 10/2001 | Raab et al. | |
| 8,006,850 B2 | 8/2011 | Rotheisler | |
| 2002/0162414 A1 | 11/2002 | Lundstrom et al. | |
| 2008/0087240 A1 | 4/2008 | Flierl et al. | |
| 2010/0204713 A1 | 8/2010 | Ruiz Morales | |
| 2011/0072930 A1 * | 3/2011 | Bayer | B25J 19/0012 74/490.01 |
| 2012/0095596 A1 | 4/2012 | Cole et al. | |
| 2014/0202276 A1 * | 7/2014 | Song | B25J 9/046 74/490.05 |
| 2016/0332312 A1 * | 11/2016 | Song | B25J 9/06 |

FOREIGN PATENT DOCUMENTS

| | | |
|---|---|---|
| KR | 10-0760846 B1 | 9/2007 |
| KR | 10-2007-0122209 A | 12/2007 |
| KR | 10-0788787 B1 | 12/2007 |
| KR | 10-0909041 B1 | 7/2009 |
| KR | 10-2010-0064654 A | 6/2010 |
| KR | 10-2011-0024834 A | 3/2011 |
| KR | 10-2011-0035917 A | 4/2011 |
| KR | 10-2013-0028542 A | 3/2013 |
| KR | 10-1306215 B1 | 9/2013 |
| WO | WO-01/58404 A1 | 8/2001 |

OTHER PUBLICATIONS

Changhyun Cho et al., "Static Balancing of a 2-dofs manipulator", The 4th International Conference on the Advanced Mechatronics (ICAM2010), pp. 433-438, Jul. 6-9, 2010.

Wei Wang et al., "Contact Detection and Reaction of a Wheelchair Mounted Robotic Arm Equiped with Mechanical Gravity Canceller", The 2010 IEEE/RSJ International Conference on Intelligent Robots and Systems (IROS 2010), Oct. 18-22, 2010, pp. 4378-4383.

* cited by examiner (a)   (b)

(a)  (b)

MULTI-DEGREE OF FREEDOM TORQUE-FREE LINKAGE UNIT

TECHNICAL FIELD

The present invention relates to a gravity compensation mechanism, and more particularly, to a structure which mechanically compensates for the gravitational torque produced at a rotational joint due to a link's own weight so that the motor torque needed to support the link's own weight at the time of the stoppage or rotation of the link is zero.

In the case of most of devices (e.g., robot manipulators) having a serial structure composed of joints and links, torque motors mounted at respective joints are mostly used to support the weights of the links.

In this case, since the motor torque required to compensate for the gravity varies continuously depending on the movement of the device, a complex dynamic equation is required to be solved to calculate a necessary torque.

Therefore, there is a need for the development of various types of the gravity compensation mechanisms that can properly compensate for the gravitational torque applied due to the link's own weight, thereby minimizing the motor torque needed to maintain or the postures of mechanical parts or move the mechanical parts By virtue of this, it is possible to develop a mechanism that can minimize the capacity of a necessary motor or provide a greater power for a work performed by the device despite the use of the same motor.

In addition, the application range of the gravity compensation mechanism is extended to a multi-degree-of-freedom (MDOF), which makes it possible to compensate for the gravitational torque applied to all the joints.

BACKGROUND ART

A gravity compensation mechanism which has been developed so far largely employs a method of using of a weight and a method of using a spring and a wire.

In particular, in the industrial equipment, an appropriate weight is installed at a side opposite to a point of application of a force in order to maintain the center of gravity and compensate for the equipment's own weight.

However, such a method increases the entire mass and volume of the mechanical parts increases, thus leading to a difficulty in using it in robot arms in which the design for lightweightness and compactness and the collision safety are important.

In an attempt to solve this problem, a method of using a compression force and a tensile force of the spring has been proposed.

This method employs a spring repulsive force generated when the wire connected to the link stretch or compress the spring at the time of the rotation of the link in order to compensate for the weight of the link.

Such a method employing the spring enables the gravity compensation mechanism to be manufactured in a relatively small volume and weight compared to a conventional method.

However, the above method is highly likely to cause a problem in that when the gravity compensation mechanism is used for a long period of time, the wire may be damaged, such as being stretched or cut out, thus leading to a reduction in the performance of the gravity compensation mechanism, and resulting in a threat to safety.

Therefore, there is a need for the development of a novel multi-degree of freedom (MDOF) gravity compensation device having high reliability and durability, which can substitute for the conventional wire-based gravity compensation device in order to realize the practical use and commercialization of the gravity compensation device which has been developed.

The basic operation concept of the counterbalancer provided in the present invention is as shown in FIG. 1.

As shown in FIG. 1(a), when a general link having one degree of freedom is rotate by θ, the following gravitational torque $T_g$ is applied to a joint:

$$T_g(\theta) = mgl\sin\theta$$

where m is a mass of the link and l is a distance to the center of gravity.

Thus, in general, a motor and a speed reducer which can sufficiently support the gravitational torque applied to the joint is required to be used in order to rotate the link or maintain the posture of the link. In case of this link, as shown in FIG. 1(a), a spring can be interposed between a reference plane and the link so as to compensate for the gravitational torque applied to the joint at a certain position by the link's own weight.

However, the gravitational torque varies depending on the rotational displacement of the link as show in FIG. 1(b), and thus a gravity compensation device is needed in which a required torque can be zero in all the displacements by properly compensating for the torque varying depending on the angle in order to perform complete gravity compensation.

In the case where such a gravity compensation device is mounted at the robot arm, the gravitational torque applied from the weight of a robot is offset to remarkably reduce a torque required for the movement of the robot so that the robot arm can be configured only with a low-capacity motor and a speed reducer.

Various kinds of gravity compensation devices employing the spring were developed to obtain such gravity compensation, but a problem involved in weight and reliability has been posed continuously.

In order to solve this problem, the present inventors have proposed a configuration of a gravity compensation mechanism using a wire and a gravity compensation mechanism that matches a reference point relative to the ground surface during the rotation of the joint so as to minimize the required torque needed to perform the gravity compensation, which are disclosed in Korean Patent Application No. 10-2011-0092171.

In FIGS. 2 to 4, there is disclosed a multi-link structure according to the prior applications by the present inventor, in which a stable gravity compensation structure is formed with respect to pitch joints (i.e., pitches 1, 2 and 3) parallel with the ground surface through a wire, a spring, a spring block, and a double parallelogram mechanism (see FIGS. 2 and 3).

However, in the case where a link of a serial connection structure is pivotally rotated with respect to a yaw joint perpendicular to the pitch joint of the pitch so as to be orientated at 90 degrees to the ground surface, i.e., a rotary shaft is arranged vertical to the ground surface, a rotational movement of the link around the pitch joint occurs so that even in the case where the pitch joint does not require a counterbalancing torque for gravity compensation, a compressive restoring force by the spring is formed due to the structure of a gravity compensation mechanism and a curved parallelogram unit which are mounted at the link, thus leading to occurrence of a phenomenon in which a required torque increases unnecessarily on a plane horizontal to the ground surface (see FIG. 4).

PRIOR ART LITERATURE

Patent Documents

Patent Document 1: Korean Patent No. 10-0760846 B

DISCLOSURE OF INVENTION

Technical Problem

Accordingly, the present invention has been made to solve the above-mentioned problems occurring in the prior art, and it is an object of the present invention to enable to implement a gravity compensation mechanism of a simple structure under a multi-degree-of-freedom joint by achieving gravity compensation for a link while preventing unnecessary counterbalancing torque formation under a variety of environments, i.e., even in case of a multi-axis, multi-joint structure with a complex, multi-faceted trend such as a human joint.

Another object of the present invention is to enables to compensate for a torque caused by a link's own weight, which is generated at all the joints according to the posture of the link during the operation of the robot arm through the development of a novel multi-degree-of-freedom gravity compensation device having improved durability and reliability of the conventional wire-based gravity compensation device.

Still another object of the present invention is to enable to perform gravity compensation under various operation conditions while performing the smooth rotation on a multi-degree of freedom device and preventing the occurrence of undesirable behaviors due to an unnecessarily generated torque by providing a curved parallelogram unit and a counterbalancer.

In addition, yet another object of the present invention is to provide a gravity compensation device that can produce an appropriate counterbalancing torque by compressing a spring using a mechanism element having a relatively high reliability such as a slider-crank mechanism as a counterbalancer, and to extend, the application range of the gravity compensation device, which has been developed, to the multi-degree of freedom.

By virtue of this configuration, the reliability and lifespan of the gravity compensation device is improved and the applicable environmental range is remarkably increased so that the applicable versatility of a device configuration can be extended, thereby improving practicability.

Furthermore, a robot's own weight as well as the weight of an object gripped by the robot can be compensated for through the implementation of variable gravity compensation that can change a counterbalancing torque in real-time, thereby maximizing the performance of the robot.

Technical Solution

To achieve the above objects, the present invention provides a link that can compensate for a torque generated by the link's own weight to maintain the posture of the link even at any position, a structure including the link, and a gravity compensation device.

In one aspect, the present invention provides a multi-degree-of-freedom, torque-free linkage device comprising: a root link; a base link rotatably connected to the root link to form a base joint; a first link connected at one end thereof to the base link to form a first joint that intersects the base joint, the center of gravity of the first link being positioned so as to be spaced apart from the first joint along the longitudinal direction thereof; a counterbalancer including a first counterbalancer disposed at the first link in such a manner as to be disposed at one end thereof at a side of the first joint and disposed at the other end thereof along the longitudinal direction of the first link so that when the first link moves relative to the root link, the first counterbalancer can perform gravity compensation on the first link; and a curved parallelogram unit including a base reference part securely fixed to the root link, a first reference part rotatably disposed at the first joint formed by the base link and the first link and connected to the first counterbalancer, and a parallelogram transmission part configured to connect the base reference part and the first reference part to each other and form a reference position for achieving a gravity compensation for another link connected to the base link by rotating the first reference part around the first joint when the base link moves relative to the root link.

In the multi-degree-of-freedom, torque-free linkage device, each of the first counterbalancer and the curved parallelogram unit may be provided in pair, and at least parts of the first counterbalancer and the curved parallelogram unit may be disposed along the longitudinal direction of the first joint in such a manner as to be spaced apart from each other in a direction perpendicular to the longitudinal direction of the first joint.

In the multi-degree-of-freedom, torque-free linkage device, the parallelogram transmission part may be a parallelogram wire formed as a wire.

In the multi-degree-of-freedom, torque-free linkage device, the parallelogram wire may be fixed at one end thereof to the base reference part to surround the outer circumferences of the base reference part and the first reference part in this order so as to form a pair.

In the multi-degree-of-freedom, torque-free linkage device, the curved parallelogram unit may further include a parallelogram wire guide disposed at the base link in such a manner as to be interposed between the base reference part and the first reference part on a path of the parallelogram wire and configured to guide the progress of the parallelogram wire.

In the multi-degree-of-freedom, torque-free linkage device, the base link may be formed in a "⊏" shape, the first reference part may be formed in pair such that the pair of the first reference parts confront each other and are spaced part from each other, and the base reference part may be disposed to orthogonally cross the first reference part.

In the multi-degree-of-freedom, torque-free linkage device, one of the parallelogram wires may be wound in a clockwise direction around the outer circumferences of the base reference part and the first reference part and the other of the parallelogram wires may be wound in a counterclockwise direction around the outer circumference of the base reference part and the first reference part.

In the multi-degree-of-freedom, torque-free linkage device, the first counterbalancer may include: a first spring block disposed spaced apart from the first reference part disposed at the base link so as to be movable along the longitudinal direction of the first link; a first connecting rod rotatably disposed at one end thereof in such a manner as to be radially spaced apart from a rotation center for the first joint of the first reference part and is rotatably connected at the other end thereof to the first spring block side so that the first spring block moves along with the relative rotation of the first link around the first joint; and a first spring disposed the first spring block and the first reference part.

In the multi-degree-of-freedom, torque-free linkage device, the first link may include: a first link plate comprising a first link plate A part and a first link plate B part that are arranged to be opposed to each other with the first spring block and the first spring interposed therebetween, the first link plate A part being disposed between the first reference part and the first spring, and the first link plate B part being disposed in such a manner that the first spring block is interposed between the first link plate B and the first spring; and a first link shaft disposed between the first link plate A part and the first link plate B part of the first link plate, and wherein the first connecting rod may be penetratingly disposed in the first link plate A part of the first link plate, and the first spring may be disposed on the outer circumference of the first link shaft along the longitudinal direction of the first link shaft.

In the multi-degree-of-freedom, torque-free linkage device, the first counterbalancer may include a first rod block disposed at one side of the first spring block so as to be oriented toward the first link plate A part in the movement direction of the first spring block, and may be rotatably connected to the other end of the first connecting rod.

In the multi-degree-of-freedom, torque-free linkage device, the first counterbalancer may further include a rod adjustment unit configured to adjust the arrangement position of one end of the first connecting rod.

In the multi-degree-of-freedom, torque-free linkage device, the rod adjustment unit may include an adjustment lead screw and an adjustment block at the first reference part, wherein the adjustment lead screw may be disposed radially from the center of the first joint and is adjustable in rotation in the longitudinal direction thereof, and wherein the adjustment block may be adjustable in position radially from the center the first joint in response to the rotation of the adjustment lead screw along the longitudinal direction of the adjustment lead screw, and allows one end of the first connecting rod to be rotatably mounted thereon.

In the multi-degree-of-freedom, torque-free linkage device, the root link may include a root base drive unit configured to form a rotational force of the base link, and wherein the root base drive unit may include: a root base actuator configured to create a rotational force around a rotary axis of the base joint; and a root base link power transmission part disposed between the root base actuator and the base link side and configured to transmit the rotational force of the root base actuator to the base link side to form a relative rotation of the base link.

In the multi-degree-of-freedom, torque-free linkage device, the root base link power transmission part may include: a root base drive gear connected to the root base actuator; and a root base ring gear fixedly mounted to a side of the base link so as to be meshed with the root base drive gear.

In the multi-degree-of-freedom, torque-free linkage device, the base link may include a base first link drive unit configured to form a rotational force of the first link, and wherein the base first link drive unit may include: a base first link actuator configured to generate a rotational force around a rotary axis oriented perpendicular to the longitudinal direction of the first link; and a base first link power transmission part disposed between the base first link actuator and the first link side and configured to transmit the rotational force of the base first link actuator to the first link side to form a relative rotation of the first link.

In the multi-degree-of-freedom, torque-free linkage device, the base first link power transmission part may include: a base first link drive gear connected to the base first link actuator; and a base first link ring gear fixedly mounted to a side of the first link so as to be meshed with the base first link drive gear.

In the multi-degree-of-freedom, torque-free linkage device, the multi-degree of freedom torque-free linkage device may further include a second link rotatably connected at one end thereof to the first link to form a second joint, the center of gravity of the second link being positioned so as to be spaced apart from the second joint along the longitudinal direction thereof, wherein the second link may include a second counterbalancer 600 disposed at one end thereof at the second joint side and disposed at the other end thereof along the longitudinal direction of the second link so that when the second link rotates around the second joint, gravity compensation can be performed on the second link, wherein the parallelogram transmission part may be a parallelogram wire formed as a wire to form a pair, wherein the curved parallelogram unit may further include a second reference part rotatably disposed at an end of the second link that forms the second joint, wherein after the parallelogram wire is surroundingly wound at one end thereof on the outer circumference of the first reference part and is retained on the first reference part, it may extend along the longitudinal direction of the second link, and the parallelogram wire may be surroundingly wound at the other end thereof on the outer circumference of the second reference part and is retained on the second reference part, and wherein one of the parallelogram wires may be wound in a clockwise direction around the outer circumferences of the second reference part and the other of the parallelogram wires may be wound in a counterclockwise direction around the outer circumference of the second reference part.

In the multi-degree-of-freedom, torque-free linkage device, the second counterbalancer may include: a second spring block arranged spaced apart from the second reference part rotatably disposed at an end of the second link, which forms the second joint, so as to be movable along the longitudinal direction of the second link; a second connecting rod rotatably disposed at one end thereof in such a manner as to be radially spaced apart from a rotation center for the second joint of the second reference part and is rotatably connected at the other end thereof to the second spring block side so that the second spring block moves along with the rotation of the second reference part, thus along with the relative rotation of the second link around the second joint; and a first spring disposed the second spring block and the second reference part.

In the multi-degree-of-freedom, torque-free linkage device, the second link may include: a second link plate comprising a second link plate A part and a second link plate B part that are arranged to be opposed to each other with the second spring block and the second spring interposed therebetween, the second link plate A part being disposed between the second reference part and the second spring, and the second link plate B part being disposed in such a manner that the second spring block is interposed between the second link plate B and the second spring; and a second link shaft disposed between the second link plate A part and the second link plate B part of the second link plate, and wherein the second connecting rod may be penetratingly disposed in the second link plate A part of the second link plate, and the second spring may be disposed on the outer circumference of the second link shaft along the longitudinal direction of the second link shaft.

In the multi-degree-of-freedom, torque-free linkage device, the second counterbalancer may include a second rod block disposed at one side of the second spring block so as to be oriented toward the second link plate A part in the movement direction of the second spring block, and may be rotatably connected to the other end of the first connecting rod.

In the multi-degree-of-freedom, torque-free linkage device, the second first counterbalancer may further include a rod adjustment unit configured to adjust the arrangement position of one end of the second connecting rod.

In the multi-degree-of-freedom, torque-free linkage device, the rod adjustment unit may include an adjustment lead screw and an adjustment block at the first reference part, wherein the adjustment lead screw may be disposed radially from the center of the first joint and is adjustable in rotation in the longitudinal direction thereof, and wherein the adjustment block may be adjustable in position radially from the center the second joint in response to the rotation of the adjustment lead screw along the longitudinal direction of the adjustment lead screw, and allows one end of the second connecting rod to be rotatably mounted thereon.

In the multi-degree-of-freedom, torque-free linkage device, the first link may include a second drive unit configured to form a rotational force of the second link, and wherein the second drive unit may include: a second motor configured to generate a rotational force around a rotary axis perpendicular to the longitudinal direction of the second link; and a second link power transmission part disposed between the second motor and the second link side and configured to transmit the rotational force of the second motor to the second link side to form a relative rotation of the second link to the second reference part.

In the multi-degree-of-freedom, torque-free linkage device, the second link power transmission part may include: a second pinion gear connected to the second motor; and a second ring gear fixedly mounted to the second link side and meshed with the second pinion gear.

Advantageous Effects

The multi-degree-of-freedom, torque-free linkage device according to the embodiments of the present invention as constructed above have the following advantageous effects.

First, the multi-degree-of-freedom, torque-free linkage device of the present invention can mechanically compensate for a torque generated due to gravity at a component having weight such as a link of a robot so that the provision of a gravitational torque from a motor can be prevented to reduce a load to occur at the motor. As a result, the use of the same motor can bear a greater load or a smaller motor can be used for a given load, thus resulting in an improvement of the performance and a reduction of the manufacturing costs.

Second, the counterbalancer of the multi-degree-of-freedom, torque-free linkage device of the present invention employs a slider-crank mechanism to implement a multi-degree-of-freedom gravity compensation device, thus leading to an increase in durability and reliability.

Third, the curved parallelogram unit of the multi-degree-of-freedom, torque-free linkage device of the present invention enables to implement a multi-degree-of-freedom gravity compensation device that can compensate for a gravitational torque applied by the rotation of an existing pitch joint as well as a gravitational torque applied by the rotation of yaw and roll joints so that the gravity compensation device can be applied to both a floor-mounted PUMA robot arm and a wall-mounted humanoid robot arm and the application range of the gravity compensation can be extended remarkably to strengthen versatility.

Fourth, according to the multi-degree-of-freedom, torque-free linkage device of the present invention, the variable gravity compensation is easily implemented so that a robot's own weight as well as the weight of an object gripped by the robot can be compensated for, thereby maximizing the nominal load capacity of the robot.

Fifth, the actual application of the multi-degree-of-freedom, torque-free linkage device of the present invention as a multi-axis articulated robot can greatly reduce the capacity of the motor and the speed reducer, thus leading to a significant decrease in the price of the robot, and the use of a low-capacity motor can increase the energy-saving effect.

BRIEF DESCRIPTION OF THE DRAWINGS

The above and other objects, features and advantages of the present invention will be apparent from the following detailed description of the preferred embodiments of the invention in conjunction with the accompanying drawings, in which.

BEST MODE FOR CARRYING OUT THE INVENTION

Figure 1:
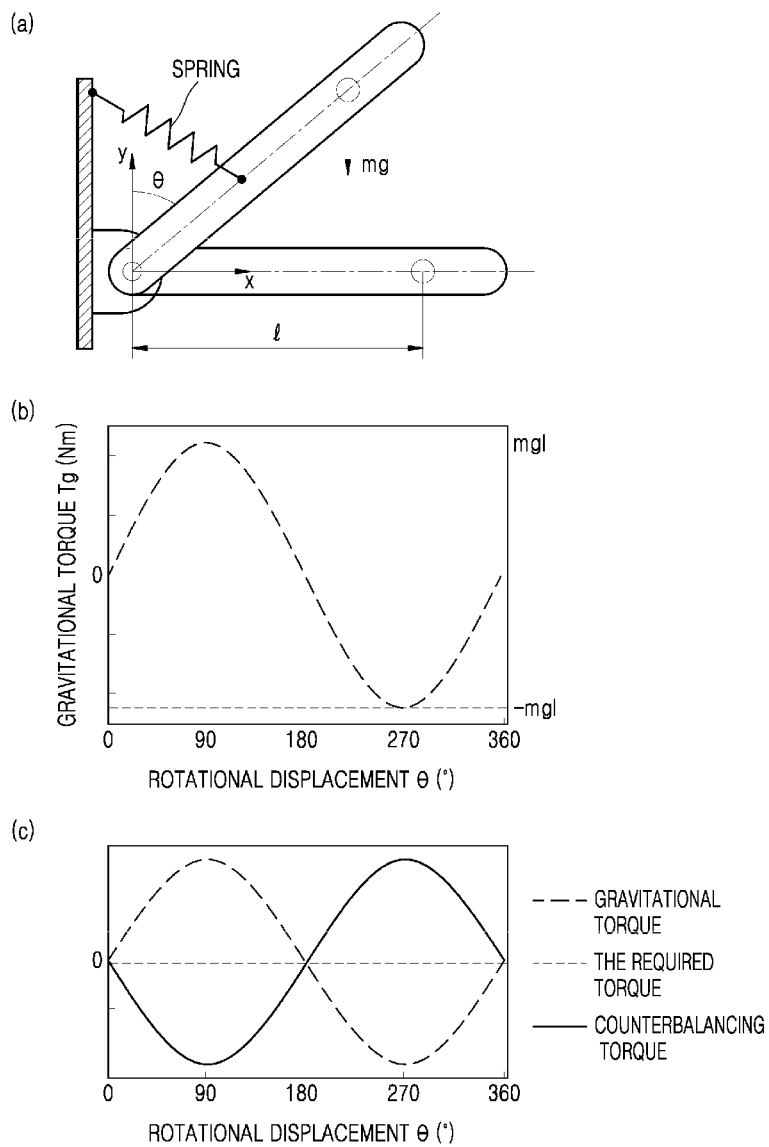
FIG. 1 is one degree of freedom robot arm for representing a gravitational torque.
Figure 2:
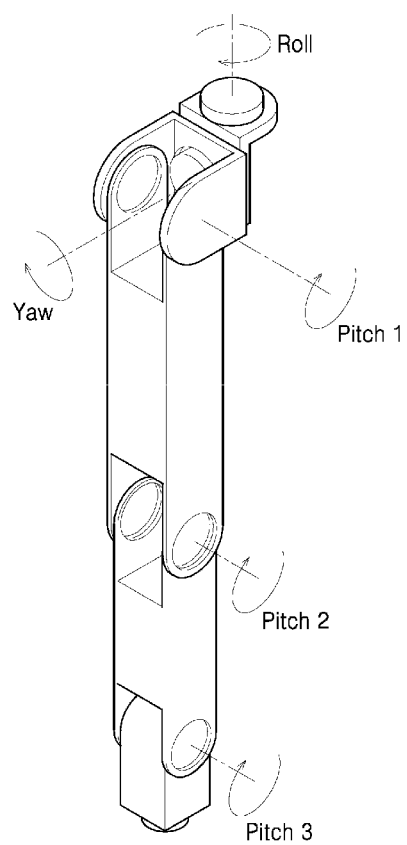
FIGS. 2 to 4 are examples of a multi-link structure according to the prior art.
Figure 3:
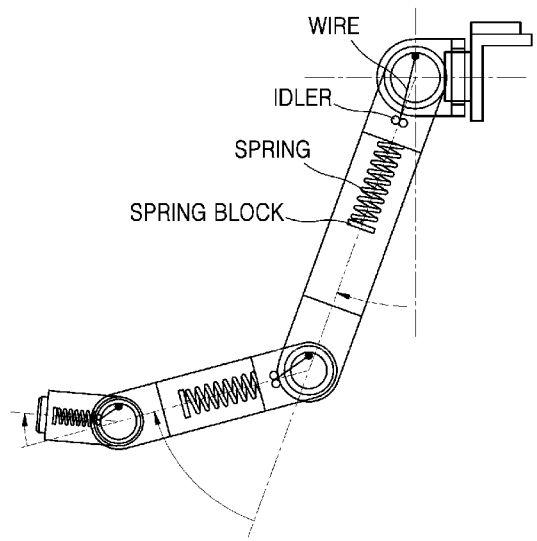
Figure 4:
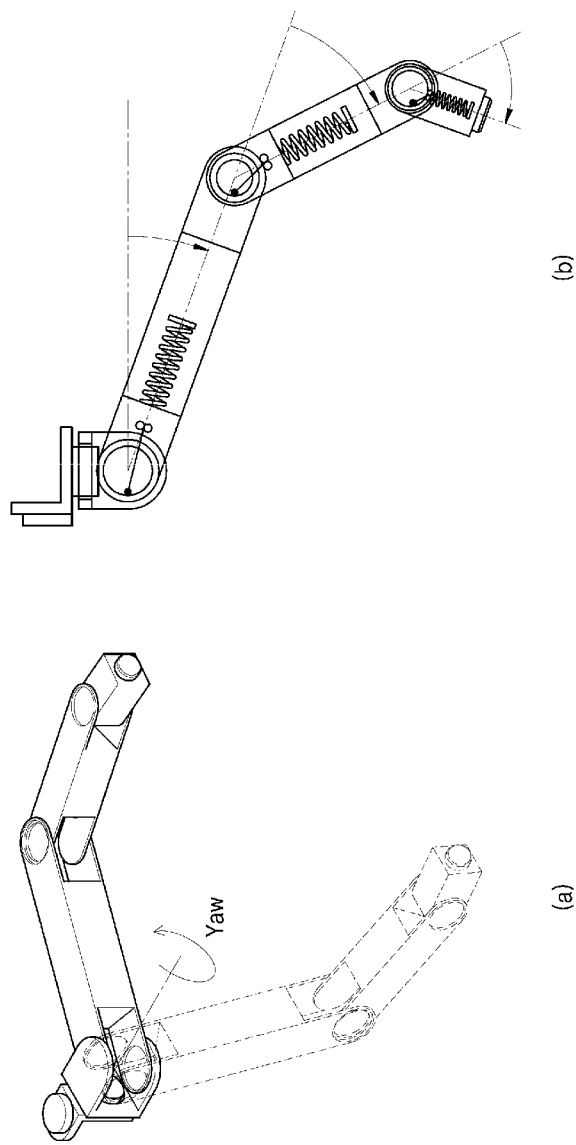

Hereinafter, preferred embodiments of a multi-degree-of-freedom, torque-free linkage device according to the present invention will be described hereinafter in detail with reference to the accompanying drawings. It should be noted that the same elements in the drawings are denoted by the same reference numerals although shown in different figures. In the following description, the detailed description on known function and constructions unnecessarily obscuring the subject matter of the present invention will be avoided hereinafter.

The multi-degree-of-freedom, torque-free linkage device of the present invention is implemented in the form of a robot arm, but this is merely an example for describing the present invention, and the multi-degree-of-freedom, torque-free linkage device of the present invention may be constructed in various manners, such as taking a mechanical structure which does not require an additional driving force as well as structure in which a single link is arranged and a structure in which a plurality of consecutive links is arranged. The multi-degree-of-freedom, torque-free linkage device of the present invention will be described centering on the case where it is implemented as a robot arm having the structure in which the plurality of consecutive links is arranged.

In addition, the autonomous mobile-based automated guided vehicle system of the present invention includes a counterbalancer and/or a curved parallelogram unit by each link, which will be described later, or can be constructed in various manners through an alternative or combination method.

A multi-degree-of-freedom, torque-free linkage device 10 of this embodiment includes a root link 100, a base link 200, a first link 300, counterbalancers 400 and 600, and a curved parallelogram unit 700.

In a specific embodiment of the present invention which will be described later, the counterbalancer takes a slider-crank structure as first link plate A part of the present invention, but may be modified in various manners such as being formed as a wire-based structure, if necessary.

The multi-degree-of-freedom, torque-free linkage device 10 may take a structure in which a second link 500 is further disposed at an end of the first link 300, and an end effector (not shown) that can be implemented as a roll motor or a gripper can be further disposed at an end of the second link 500.

Basically, the multi-degree-of-freedom, torque-free linkage device 10 according to this embodiment includes a counterbalancer as a gravity compensation mechanism for compensating for a torque due to a link's own weight, which is generated depending on a change in the position of the link under a multi-degree-of-freedom environment. In addition, the multi-degree-of-freedom, torque-free linkage device 10 according to this embodiment includes a curved parallelogram unit as a parallelogram unit for preventing an increase in the required torque due to an unnecessary counterbalancing torque during the movement of a link under an environment in which the link is horizontal to the ground surface in a multi-joint, multi-link structure, and enabling to minimize the required torque that is needed by matching a reference position so as to enable a gravity compensation that produces a counterbalancing torque that compensates for a gravitational torque due to the link's weight, which is generated when the link is moved horizontally to the ground surface.

Hereinafter, the mechanical operation process and the characteristics of the counterbalancer as the gravity compensation mechanism and the curved parallelogram unit that are particular elements of the present invention First, in case of the gravity compensation mechanism, the counterbalancers 400 and 600 provided in the multi-degree-of-freedom, torque-free linkage device of the present invention 10 forms a structure of a slider-crank mechanism.

The counterbalancers 400 and 600 serves to effectively offset a gravitational torque generated by the weight of a link, a joint, and a motor of a drive unit, and the like so that the actual required torque approaches zero.

In this case, the magnitude of the gravitational torque varies depending on the position of the link, but a required power is minimized by removing or minimizing the required torque in order to compensate for a torque generated by the link's own weight so that a compact structure can be formed through the miniaturization of the drive unit in increasing usability of the power produced by the drive unit or implementing the same operation.

In addition, the application range of the gravity compensation mechanism is extended to a multi-degree of freedom so that the gravity compensation for all the joints can be achieved.

Figure 5:
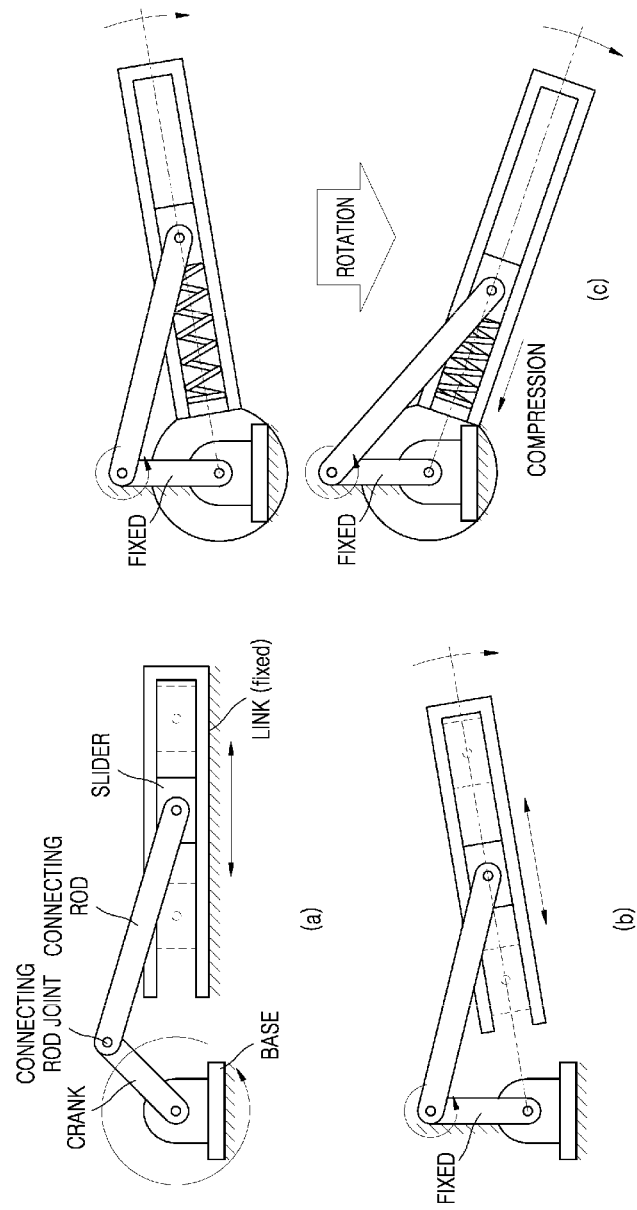
FIG. 5 is a configuration diagram showing the operational principle of a slider-crank mechanism type counterbalancer of a multi-degree-of-freedom, torque-free linkage device according to an embodiment of the present invention.

The multi-degree-of-freedom, torque-free linkage device of the present invention includes a counterbalancer as a slider-crank mechanism type gravity compensation device. The basic operation concept of the counterbalancer provided in the present invention is as shown in FIG. 5.

In general, in case of a slider-crank mechanism composed of a crank, a connecting rod, and a link including a guide for a slider, as shown in FIG. 5(a), the slider moves forwards or backwards by the connecting rod having a certain length as the crank rotates.

In FIG. 5(b), there is shown a slider-crank mechanism having a modified shape, i.e., an inverse slider-crank mechanism.

In this case, since the crank is fixed, the slider moves forwards or backwards by the connecting rod as the link rotates.

The present invention utilizes such a modified slider-crank mechanism to insert a spring into the inside of the link (i.e., between the slider and a fixed part) and fix a structure corresponding to the crank in position to cause the slider moving by the connecting rod along with the rotation of the link to compress the spring as shown in FIG. 5(c) so that the counterbalancer can be implemented as the gravity compensation device capable of producing a counterbalancing torque suitable for a rotating joint due to a spring compensation force.

Figure 6:
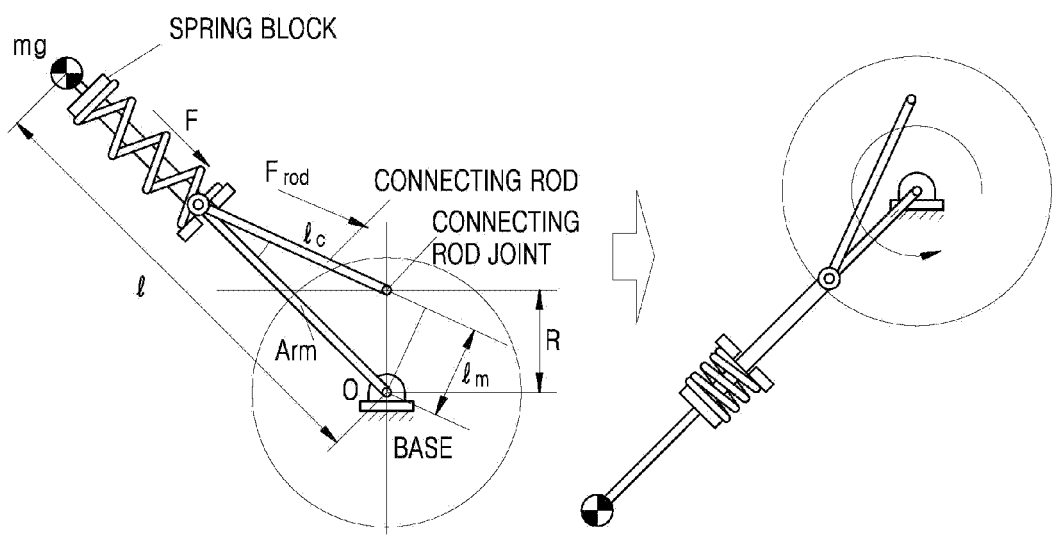
FIG. 6 is a configuration diagram showing a counterbalancer using a slider-crank mechanism of a multi-degree-of-freedom, torque-free linkage device according to an embodiment of the present invention.

The conceptual structure diagram of the counterbalancer as the slider-crank type gravity compensation device of the present invention is as shown in FIG. 6.

An arm as a link is rotatably mounted at a fixed base and a spring is elastically deformed between a spring block and another fixed part mount at the link. One end of the spring block is rotatably mounted to the spring block and the other end of the spring block is disposed at a reference unit so as to be spaced apart from the center.

In this embodiment, the counterbalancer takes a structure in which the other end of the connecting rod is directly connected to the reference unit, but may a structure in which the other end of the connecting rod is integrally connected or extends to the reference unit through a constituent element fixed to the reference unit, but not rotated relative to the reference unit.

In this case, when it is assumed that a crank corresponding to a base link side has a rotary fixed structure, and a frame having a distance R from a link rotary axis of the base to a connecting rod joint is a crank, the connecting rod having a length $l_{cr}$ moves a spring block that moves forwards or backwards along a guide disposed on the link as the link rotates, and a spring having a rigidity k is compressed by a length s, which is expressed as follows:

$$s = l_{cr} + R - (l_{cr} \cos \Phi + R \cos \theta) + s_o$$

where φ is an angle between the connecting rod and the link, and $s_o$ is an initial compression distance of the spring.

A distance $l_m$ between the connecting rod and the rotary center O can be calculated as follows:

$$l_m = R \sin(\Phi + \theta)$$

Therefore, when it is assumed that the initial compression distance of the spring is $s_o$, a component force $F_{rod}$ acts on the connecting rod joint, which is expressed as follows:

$$F_{rod} = ks/\cos \Phi = k\{l_{cr} + R - (l_{cr} \cos \Phi + R \cos \theta) + s_o\}/\cos \Phi$$

Therefore, a counterbalancing torque $T_c$ is generated at the joint according to the component force $F_{rod}$ and the distance $l_m$, which is expressed as follows:

$$T_c = F_{rod} l_m$$
$$= \frac{ks}{\cos \phi} R \sin(\phi + \theta)$$
$$= ksR(\sin\theta + \cos\theta \tan\phi)$$
$$= kR\{l_{cr} + R - (l_{cr}\cos\Phi + R\cos\theta) + s_0\}(\sin\theta + \cos\theta\tan\phi)$$

Therefore, in the present invention, various design variables of the above mathematical expression are adjusted to design a gravity compensation device capable of appropriately compensating for a targeted gravitational torque.

In addition, since it is difficult to eliminate the rotation variables θ and φ in the counterbalancing torque for the structure, it is difficult to produce a compensation torque that is completely identical to the gravitational torque, but there may occur a frictional force, and an error between a design model and a product in the actual use. Further, a slight difference occurring between the gravitational torque and the counterbalancing torque can be sufficiently supported by an actuator.

Thus, a counterbalancing torque closest to the gravitational torque is produced through the adjustment of the design variables so that the required torque during the rotation of the joint can be substantially set to 0 or can be used within a supportable range through an actuator such as a motor.

Besides, the counterbalancer of the present invention may take a structure in which the position of the connecting rod joint is changed in the control of the design variables for the counterbalancing torque.

Figure 7:
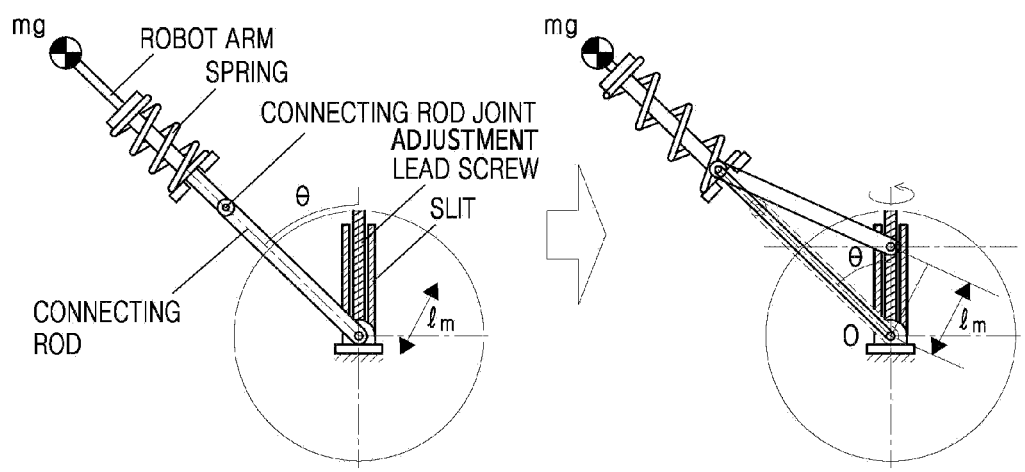
FIG. 7 is a configuration diagram showing a counterbalancer using a slider-crank mechanism of a multi-degree-of-freedom, torque-free linkage device according to a modification of an embodiment of the present invention.

In other words, as shown in FIG. 7, the multi-degree-of-freedom, torque-free linkage device including the counterbalancer as the slider-crank-based gravity compensation device can adjust the magnitude of the counterbalancing torque produced through the counterbalancer.

That is, the counterbalancer of the multi-degree-of-freedom, torque-free linkage device may further include a rod adjustment unit configured to adjust the arrangement position of one end of the first connecting rod.

The rod adjustment unit of the present invention takes a lead screw mechanism as show in FIG. 7.

The rod adjustment unit includes an adjustment lead screw 와 adjustment block.

The rod adjustment unit includes an adjustment lead screw and an adjustment block. The adjustment lead screw is disposed radially from the center O of the rotation of a robot arm as a link. The adjustment block is disposed on the adjustment lead screw so that the adjustment block can be moved on the lead screw through a predetermined manipulation, and one end of the connecting rod is rotatably mounted at the adjustment block.

An adjustment slit is disposed at the outside of the adjustment lead screw so that the stable rectilinear movement of the adjustment block can be guided.

In other words, the position of the adjustment block is changed by the rotation of the adjustment lead screw so that the magnitude of a counterbalancing torque generated by the counterbalancer can be changed.

By virtue of this, in the case where a gravitational torque generated due to a robot's own weight and an additional link's own weight are applied to the linkage device, e.g., the linkage device is configured as a robot, when an object is gripped by the robot, a gravitational torque applied to the robot from the object can also be compensated for so that the nominal load capacity of the robot can be maximized.

The design variables suitable for producing a counterbalancing torque targeted by the multi-degree-of-freedom, torque-free linkage device of the present invention can set a target value through a given experiment or simulation.

Figure 8:
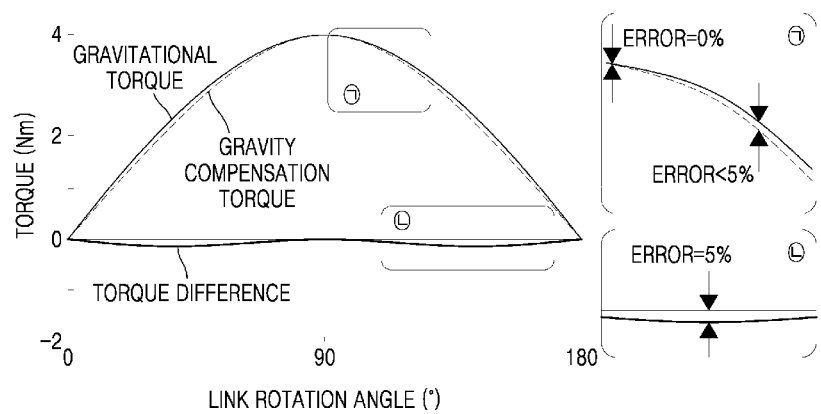
FIG. 8 is a graph showing a change in a counterbalancing torque according to a variable gravity compensation device.

As a result of the simulation, as shown in FIG. 8, a gravity counterbalancing torque having a shape that is nearly similar to that of a gravitational torque (within an error of 5% <) could be produced, which can be found in more detail from enlarged diagrams in which reference symbols "]" and "[" are indicated.

It is obvious that the required torque necessary for the gravity compensation can nearly approach zero in the rotation of the link implemented as a robot arm through the proposed counterbalancer as the slider-crank-based gravity compensation device.

Meanwhile, the multi-degree-of-freedom, torque-free linkage device of the present invention may include a curved parallelogram unit (CPU).

The curved parallelogram unit (CPU) can properly adjust the counterbalancing torque by transferring a change due to a connection structure in which a plurality of links is connected to match the reference.

A conventional one-degree-of-freedom gravity compensation mechanism shown in FIG. 1 is installed at a shoulder joint where the greatest amount of torque is required in the robot.

The reason for this is that the conventional gravity compensation mechanism does not properly respond to a change in the torque applied to another joint according to the shoulder joint of the robot arm.

Figure 9:
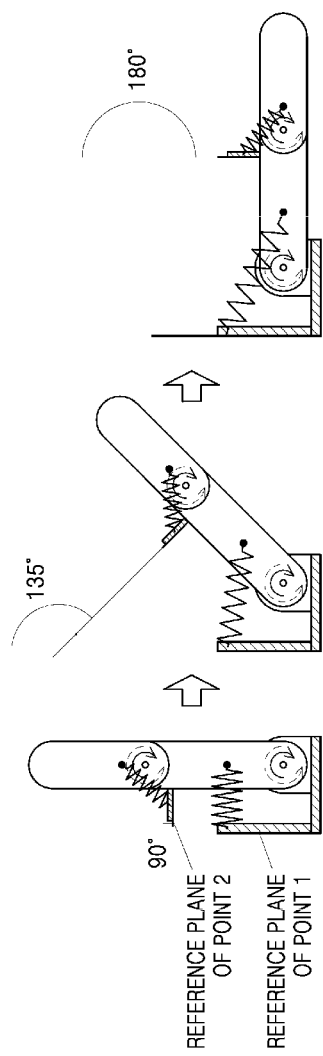
FIG. 9 is a configuration diagram showing a multi-degree of freedom link structure according to the prior art.

In FIG. 9, there is shown a configuration diagram of a gravity compensation mechanism mounted at a multi-degree-of-freedom link structure, i.e., a multi-degree-of-freedom robot arm.

In case of a first joint, a spring is mounted relative to a fixed plane (i.e., a robot body) oriented perpendicular to the ground surface so that predetermined gravity compensation can be achieved for a first link connected to the first joint.

On the other hand, in case of a second joint, an angle (i.e., a reference angle of the ground surface) of a second link as a reference of the second joint is changed along with the rotation of the first link, and thus it is impossible to achieve the gravity compensation for the required torque due to a change in the position of the second link, which occurs by the rotation of the first link.

In other words, the torque applied to the second joint is changed depending on the position of the first joint although the second joint is not moved so that it is impossible to achieve the gravity compensation according to a change in the position of the second link due to the position change of the first link.

Thus, a gravity compensation mechanism needs to be conceived which can appropriately change a torque compensated according to the motion of the upper joint, and the application range of one degree of freedom gravity compensation device was extended to a multi-degree of freedom through construction of a wire-based double parallelogram mechanism (DPM; or double parallelogram unit (DPU)) disclosed in an earlier application of the present inventors.

Figure 10:
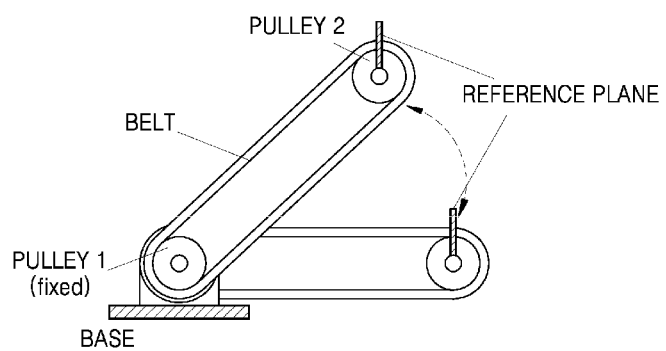
FIGS. 10 and 11 are schematic view showing a parallelogram unit of a multi-degree-of-freedom, torque-free linkage device according to an embodiment of the present invention.
Figure 11:
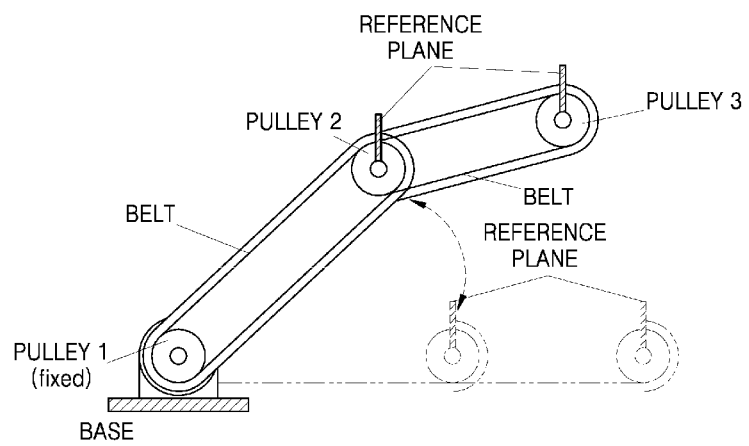

In FIGS. 10 and 11, there are shown a configuration of the wire-based parallelogram unit of the present inventors.

As shown in FIGS. 10 and 11, the parallelogram unit is composed of a pulley 1 that is fixed to a base so that the pulley 1 is prevented from rotating, a pulley 2 that is rotatably mounted at a joint 2, and a wire that interconnects the two pulleys. In addition, a pulley 3 extends so that the pulleys 2 and 3 can be connected to each other by means of the wire.

In the parallelogram mechanism consisting of the pulleys and the wire, the pulley 2 of the joint 2 and the pulley 3 of the joint 3 is always kept parallel with the pulley 1 of the joint 1.

Therefore, although the joint 1 rotates, another reference plane forming a constant angle with the ground surface is created.

In other words, a reference plane perpendicular to the ground surface is created irrespective of the position of the joint 1 through the parallelogram mechanism. When a spring is mounted relative to the reference plane, it is possible to achieve the gravity compensation for the joint 2.

However, in this configuration, in the case where a predetermined rotation operation of the joint is performed in a state in which the central axis of the joint is perpendicular to the ground surface as described above, there is no need to perform the gravity compensation with respect to each joint itself whose central axis is perpendicular to the ground surface. But, in the case where the counterbalancer and the parallelogram unit are used as they are, the required torque is increased to cause an undesired operation to occur due to formation of a counterbalancing torque in a state in which there is no gravitational torque, as a target which is to be compensated, at a corresponding joint along with unnecessary reference match.

In order to solve this problem, the present inventors propose a curved parallelogram unit as a double parallelogram mechanism having a novel structure in the present invention.

The curved parallelogram unit of the present invention takes a non-parallel arrangement structure in which a plurality of reference units is not arranged in parallel with each other while forming a predetermined angle therebetween.

In this embodiment, although the curved parallelogram unit has been implemented based on the wire, but it may have a configuration in which the wire is replaced with gears and shafts in such a manner that the gears and the shafts are alternately arranged with each other to maintain directionality under the circumstances.

However, this embodiment will be described centering on the wire-based curved parallelogram unit for the sake of understanding a compact configuration and principle.

In addition, the curved parallelogram unit of the present invention can be extended to a multi-joint, multi-degree of freedom structure through a continuous connection arrangement of pitch point links which will be described in a range of forming a non-parallel arrangement between a base reference part and a first reference part which will be described later.

The curved parallelogram unit of the multi-degree-of-freedom, torque-free linkage device of the present invention forms a curved arrangement structure.

Figure 12:
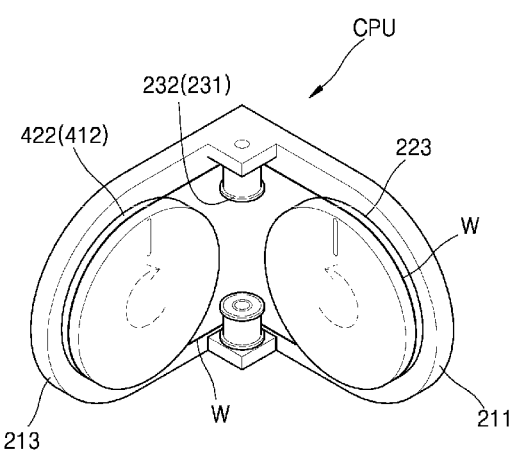
FIG. 12 is a configuration diagram showing the operational principle of a curved parallelogram unit of a multi-degree-of-freedom, torque-free linkage device according to an embodiment of the present invention.

In other words, as shown in FIG. 12, the curved parallelogram unit includes a base link, a base reference part, a first reference part, and a parallelogram transmission part that connects the base reference part and the first reference part to each other.

In this embodiment, the parallelogram transmission part is formed as a wire type parallelogram wire.

Herein, the base reference part has a structure in which it is fixed in position.

The base reference part is securely fixed to the root link 100 so that it is maintained in a state of being fixed in position without being influenced by the rotation state of the base link 200.

An axis of the base joint, which is formed by the base reference part 223, forms a yaw axis, and an axis of the first joint, which is formed by the first reference part 412 rotatably disposed at the base link 200, forms a pitch axis so that the base joint $J_B$ and the first joint $J_1$ constitutes a structure in which they are arranged so as to intersect each other.

In FIG. 12, the base link 200 is disposed so as to be bent just at 90 degrees and the first reference part 412 takes a structure in which it is provided in singular number, but this is for merely description of the principle of the curved parallelogram unit of the present invention and the base link actually implemented in the present invention may be modified in various manners such s taking a structure in which it is arranged in pair.

The base reference part 223 is penetratingly disposed at the base link 200 disposed so as to be bent just at 90 degrees, and the first reference part 412 is rotatably disposed at the base link 200 in a state of crossing the base reference part 223 at 90 degrees.

A parallelogram wire W has a structure in which it is fixed at one end thereof to the base reference part 223, surrounds the outer circumference of the base reference part 223 and the first reference part 412 in this order, and is retained by the first reference part 412.

The parallelogram wire W takes a structure in which it is disposed to form a pair such that one of the parallelogram wires is wound in a clockwise direction around the outer circumferences of the base reference part and the first reference part and the other of the parallelogram wires is wound in a counterclockwise direction around the outer circumferences of the base reference part and the first reference part. Thus, the parallelogram wire W can function to adjust or maintain a reference position for achieving a predetermined gravity compensation regardless of the rotational direction of the base link.

As shown in FIG. 12, if the base link 200 rotates in a counterclockwise direction around the base joint $J_B$, the first reference part 412 rotates in a counterclockwise direction around the first joint $J_1$. On the contrary, if the base link 200 rotates in a clockwise direction around the base joint $J_B$, the first reference part 412 rotates in a clockwise direction around the first joint $J_1$.

The curved parallelogram unit of the present invention has a structure in which the constituent elements arranged to be bent at 90 degrees as shown in FIG. 12 include an axis of the base joint $J_B$ and are symmetrical with each other on a mirror based on a plane perpendicular to the axis of the base joint $J_B$.

In other words, two reference units are created at each joint, and an individual counterbalancer is formed based on the reference units so that a sum of or a difference between gravity counterbalancing torques produced therefrom is used to effectively compensate for a gravitational torque applied to each joint, and a counterbalancing torque at a joint where the gravitational torque is formed is offset by formation of a difference between the gravity counterbalancing torques to prevent an increase in the required torque to avoid the occurrence of an unnecessary operation, thereby enabling the implementation of a stable operation including the case where an axis formed by each joint are not parallel to the ground surface.

The counterbalancer may take a slider-crank structure of the present invention, and can be implemented as a wire type counterbalancer proposed by the present inventors.

In this embodiment, the counterbalancer will be described centering on the wire type counterbalancer for the sake of a more accurate understanding of the operation, and the slider-crank structure will be described in an actually implemented embodiment of the present invention.

The wire type counterbalancer includes a counter wire We that is connected at one end thereof to the reference unit and connected at the other end thereof to a spring block, and a (compression) spring 440 disposed between the spring block 435 or 445 and the reference unit 223, 412 or 422 so that it varies depending on the rotation of the link and uses a given elastic force.

Figure 13:
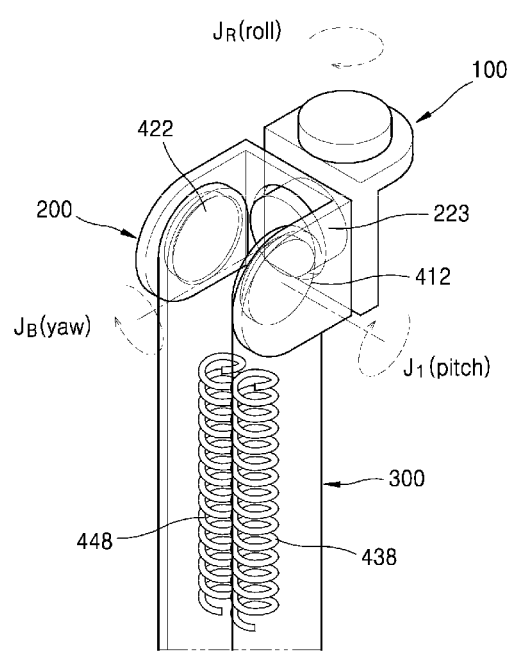
FIG. 13 is a perspective view showing an arrangement state of a curved parallelogram unit and a counterbalancer of a multi-degree-of-freedom, torque-free linkage device according to an embodiment of the present invention.

As shown in FIG. 13, each of the curved parallelogram unit and the counterbalancer 400 are disposed so as to form a pair.

Herein first link plate A part of the configuration of the curved parallelogram unit will be omitted for the sake of a more clear understanding of the operation state of the curved parallelogram unit of the present invention.

In addition, the base reference part is subsequently arranged along an axis of the base joint, i.e., a yaw axis.

The base reference parts that form a pair under the circumstances may be integrally formed with each other.

The base link can be implemented in a "⊏" shape by interconnecting a pair of "⊐" shaped base links, and forms a structure in which the first link 300 is connected to the base link based on the first joint $J_1$.

(Motion 1)

Figure 14:
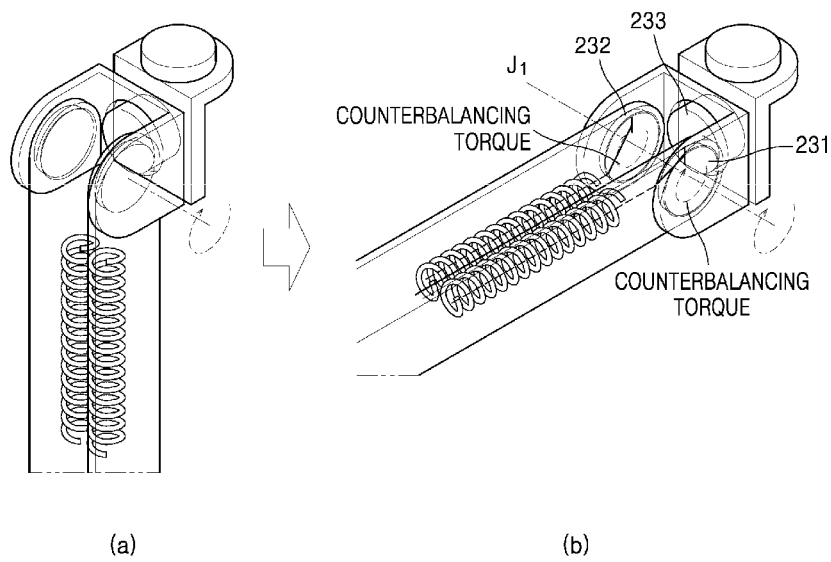
FIG. 14 is a state change diagram showing the case where a first link performs a pitch motion around a first joint $J_1$ as a pitch joint of a multi-degree-of-freedom, torque-free linkage device according to an embodiment of the present invention.
Figure 15:
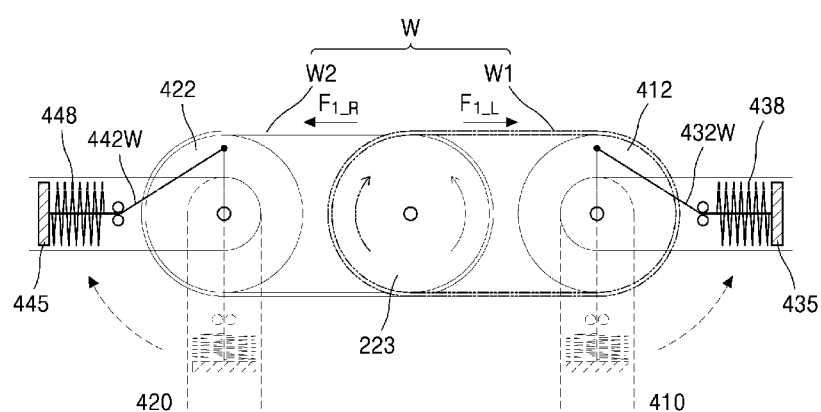
FIG. 15 is a conceptual view showing the development of a base link in FIG. 14.

In FIGS. 14 and 15, there are shown a state change diagram showing the case where the first link 300 performs a pitch motion around the first joint $J_1$ as the pitch joint and a conceptual view showing the development of the base link in which the base link having a "⊏" shaped structure is developed such that a pair of the first reference parts arranged to confront each other and cross the base reference part are developed on a plane, for the sake of an easier understanding of the operation principle of the counterbalancer and the curved parallelogram unit of the present invention.

In FIG. 15, a portion indicated by a thin dotted line denotes a state before a change, and a portion indicated by a bold solid line denotes a state after a change.

The first counterbalancer 400 of the counterbalancer includes first spring blocks 435 and 445 and first springs 438 and 448.

The first spring block (not shown) is movably disposed along the longitudinal direction of the first link 300.

The first springs 438 and 448 are disposed between the first joint $J_1$ side and the first spring blocks.

The counter wire We takes a structure in which it is connected at one end thereof to the first spring blocks (not shown) and connected at the other end thereof to the first reference parts 412 and 422.

In case of FIG. 14 (a), the first spring blocks (not shown) forms a state in which it moves to the first joint $J_1$ side to the maximum extent so that the first springs 438 and 448 are compressed to the maximum extent.

However, in this case, since the center of gravity is positioned coaxially with respect to the first joint $J_1$ as the pitch joint, a gravitational torque due to the first link's own weight is not generated, which makes it unnecessary to form a separate counterbalancing torque.

Then, when the first link 300 performs a pitch motion around the first joint $J_1$ to cause the first link 300 to form an angle of 90 degrees with respect to the ground surface, the first spring block (not shown) is changed in position to form a counterbalancing torque by means of the elastic forces of the first springs 438 and 448.

Thus, as shown in FIG. 14(b), the counterbalancing torques are formed in the arrow directions around the first joint $J_1$ so that the required torque necessary for rotating the first link 300 can be minimized.

In this case, each of two first counterbalancers 400 disposed to form a pair halfway plays a role in compensating for, i.e., counterbalancing a gravitational torque due to the first link 300's own weight.

At this time, as shown in FIG. 15 in which the base link 200 is developed, the base reference part 223 forms a wound and retained structure through the first reference parts 412 and 422 and the parallelogram wires W (W1 and W2).

Reaction forces $F1_R$ and $F1_L$ as reaction forces to the counterbalancing torques are respectively formed in arrow directions with respect to each of the first reference parts 412 and 422, and two torques formed in the directions opposite to the formation directions of the reaction forces at the base reference part 223 so that the reaction forces and the torques are offset from each other. Thus, each of the first reference parts 412 and 422 does not rotate around the first joint $J_1$ but is maintained in position, and the base reference part 223 is maintained in position without rotation around the base joint $J_B$ due to formation of a separate torque.

Although it has been illustrated and described in this embodiment that the counterbalancer is a wire type counterbalancer in which counterbalancer wires 432W and 442W are connected between the first spring blocks 435 and 445 and the first reference parts 412 and 422, and the first spring 438 and 448 are interposed between the first spring blocks 435 and 445 and the first reference parts 412 and 422 as described above, the counterbalancer may be implemented as a slider-crank type counterbalancer as described later in an actual embodiment.

Ultimately, by virtue of the counterbalancer and the curved parallelogram unit, gravity compensation for the first link 300 is achieved in a pitch motion of the first link 300, which is performed around the first joint $J_1$ as the pitch joint, or a separate yaw motion does not occur and a separate counterbalancing torque is not formed around the base joint $J_B$ as the yaw joint so that the base link 200 maintains a stable state without rotation.

(Motion 2)

Figure 16:
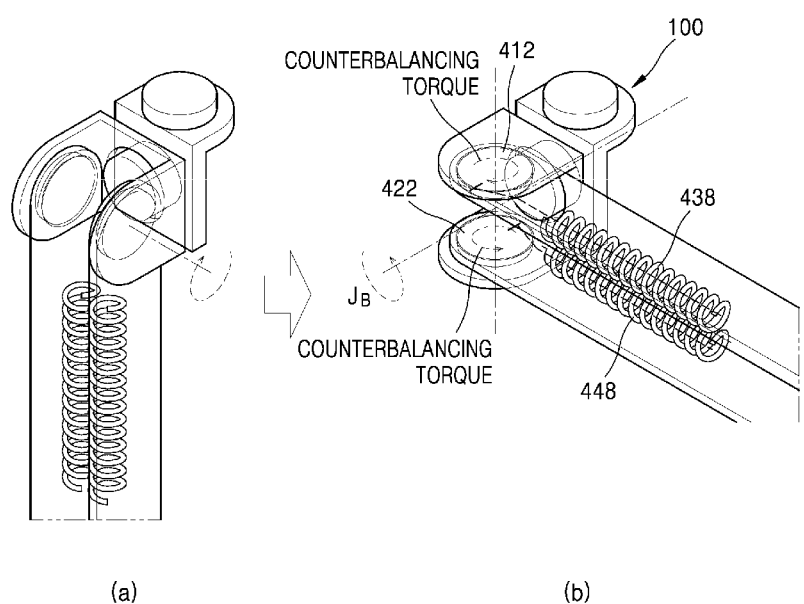
FIG. 16 is a state change diagram showing the case where a base link performs a yaw motion around a base joint $J_B$ of a multi-degree-of-freedom, torque-free linkage device according to an embodiment of the present invention.

Meanwhile, in FIG. 16, there is shown a state change diagram showing the case where the base link 200 performs a yaw motion around the base joint $J_B$ of as the yaw joint.

Figure 17:
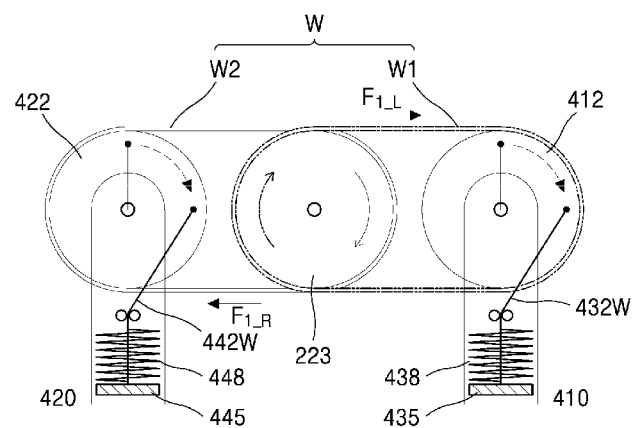
FIG. 17 is a conceptual development view showing a base link in FIG. 16.

FIG. 17 shows a conceptual development view of the base link having a "⊏" shaped structure in which a pair of the first reference parts arranged to confront each other and orthogonally cross the base reference part are developed on a plane.

In case of FIG. 16(b), the base link 200 rotates around the base joint $J_B$) in an arrow (i.e., in a clockwise direction when viewed from the root link side).

In this case, the base reference part 223 is securely fixed to the root link 100 so that it rotates relative to the base link 200 by the rotation of the base link 200.

In addition, the first reference parts 412 and 422 form a winding structure with the base reference part 223 through the respective parallelogram wires W (W1 and W2) so that they forms a predetermined rotational state in response to the relative rotation of the base link 200.

The first spring block is changed in position due to a change in the relative length of the counter wire We by the rotation of the first reference parts 412 and 422, and the first springs 438 and 448 are changed in elastic force undergoes a change in elastic force so that a predetermined torque is formed.

The thus formed torque acts as a counterbalancing torque for a gravitational torque at the base joint $J_B$ as the yaw joint.

A gravitational torque at the first joint $J_1$ as the pitch joint is not formed.

In this case, the predetermined rotational directions of the first reference parts 412 and 422 are opposite to each other in the case where the first reference parts 412 and 422 are arranged to be opposed to each other as shown in FIG. 16(b). On the other hand, the rotational directions of the first reference parts 412 and 422 are identical each other in the case where the first reference parts 412 and 422 are developed as shown in FIG. 17.

The reaction forces $F_{1\_R}$ and $F1_L$ respectively formed at the first reference parts 412 and 422 through the first counterbalancer 400 act on the base reference part 223 in the same direction while having the same magnitude so that a counterbalancing torque twice as large as the same torque acts on the base reference part 223, thereby enabling to compensate for, i.e., counterbalance the gravitational torque due to the first link's own weight, broadly the first and base links 300 and 200's own weights, and to minimize the required torque necessary to rotate the base link 200 and the first joint 300 around the base joint $J_B$.

In addition, the counterbalancer 400 forms the torques applied to the first reference parts 412 and 422 in the directions opposite to each other relative to the first joint $J_1$ as the pitch joint and thus the formed torques are offset from each other. As a result, a separate torque for the pitch joint is not formed.

(Motion 3)

Figure 18:
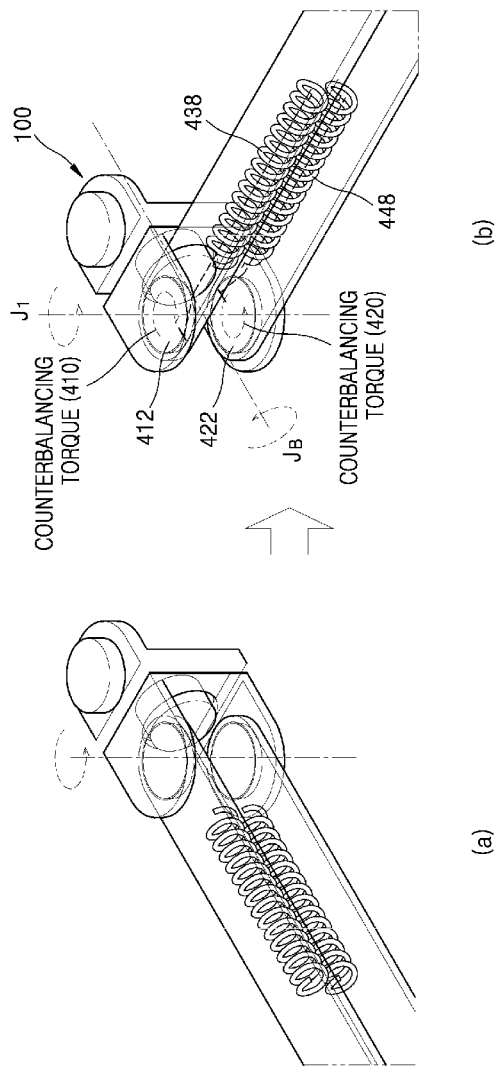
FIG. 18 is a state change diagram showing the case where a first link rotates around a first joint $J_1$ as a pitch joint in a state where the base link rotates by 90 degrees while performing a yaw motion around a base joint $J_B$ of a multi-degree-of-freedom, torque-free linkage device according to an embodiment of the present invention.

Meanwhile, there is shown in FIG. 18, a state change diagram showing the case where the first link 300 rotates around the first joint $J_1$ as the pitch joint in a state where the base link 200 rotates by 90 degrees while performing the yaw motion around the base joint $J_B$.

Figure 19:
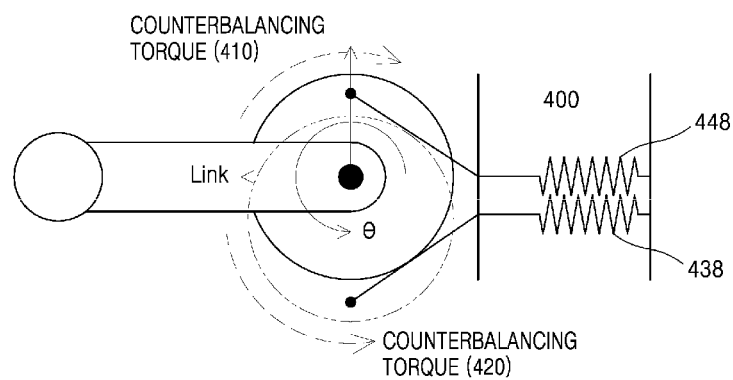
FIG. 19 is a schematic top plan view showing a structure equivalent to the structure in FIG. 18 of a multi-degree-of-freedom, torque-free linkage device according to an embodiment of the present invention.

FIG. 19 shows a schematic top plan view of a structure equivalent to the structure in FIG. 18.

Figure 20:
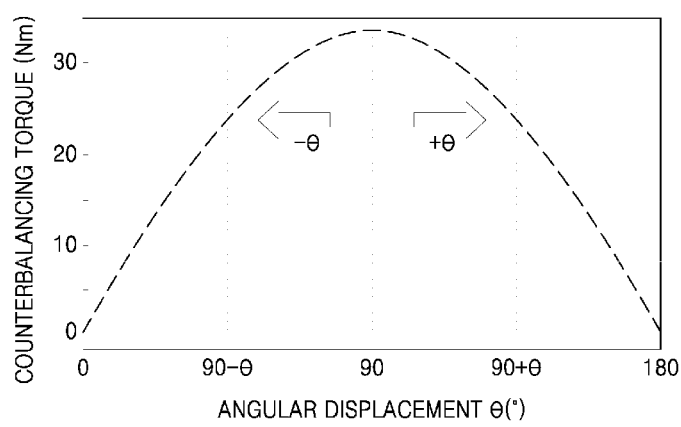
FIG. 20 is a graph showing a change in the magnitude of the counterbalancing torque with respect to the rotational angle of the first link in FIG. 19 of a multi-degree-of-freedom, torque-free linkage device according to an embodiment of the present invention.

FIG. 20 shows a graph showing a change in the magnitude of the counterbalancing torque with respect to the rotational angle of the first link in FIG. 19.

Figure 21:
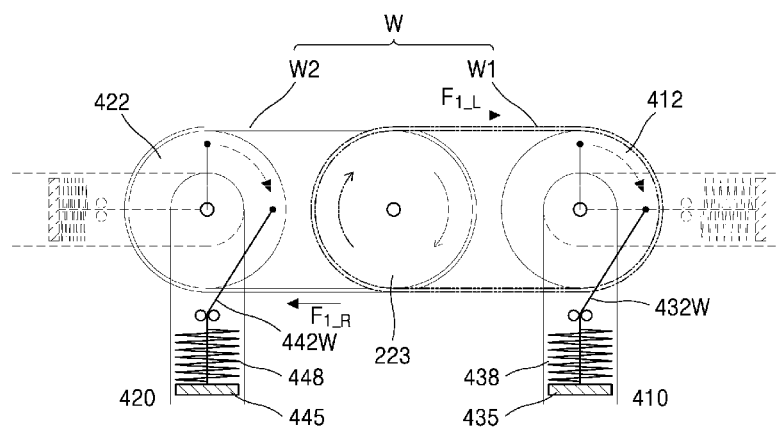
FIG. 21 is a is a conceptual view showing the development of a E-shaped base link of a multi-degree-of-freedom, torque-free linkage device according to an embodiment of the present invention.

FIG. 21 shows a conceptual development view of the base link having a "⊏" shaped structure in which a pair of the first reference parts arranged to confront each other and orthogonally cross the base reference part are developed on a plane.

In the case where the first link 300 rotates around the first joint $J_1$ as the pitch joint as show in FIG. 18(b) in a state where the base link 200 rotates by 90 degrees while performing the yaw motion around the base joint $J_B$ as show in FIG. 18(a), the first link 300 rotates around the first joint $J_1$ in an arrow direction (i.e., in a counterclockwise direction when viewed from above).

In this case, as can be seen from the equivalent structure and the angular diagram as shown in FIGS. 19 and 20, the magnitude of a torque, i.e., a counterbalancing torque varies depending on the rotational angle θ of the first joint $J_1$.

In case of the first joint $J_1$, no gravitational torque is generated, and a pair of first counterbalancers 400 forms the torques applied to the first reference parts 412 and 422 in the directions opposite to each other relative to the first joint $J_1$ as the pitch joint and thus the formed torques are offset from each other. As a result, a separate torque for the first joint $J_1$ is not formed.

On the contrary, similar to the case shown in FIGS. 16 and 17, the predetermined rotational directions of the first reference parts 412 and 422 are opposite to each other in the case where the first reference parts 412 and 422 are arranged to be opposed to each other as shown in FIG. 18(b). On the other hand, the rotational directions of the first reference parts 412 and 422 are identical each other in the case where the first reference parts 412 and 422 are developed as shown in FIG. 21.

In case of the base joint $J_B$ as the yaw joint, the reaction forces $F_{1\_R}$ and $F1\_L$ respectively formed at the first reference parts 412 and 422 through the first counterbalancer 400 act on the base reference part 223 in the same direction while having the same magnitude so that a counterbalancing torque twice as large as the same torque acts on the base reference part 223, thereby enabling to compensate for, i.e., counterbalance the gravitational torque due to the first link 300's own weight, broadly the first and base links 300 and 200's own weights, and to minimize the required torque necessary to rotate the base link 200 and the first joint 300 around the base joint $J_B$.

The first spring blocks (not shown) forms a state in which it moves to the first joint $J_1$ side to the maximum extent so that the first springs 438 and 448 are compressed to the maximum extent. However, in this case, since the center of gravity is positioned coaxially with respect to the first joint $J_1$ as the pitch joint, a gravitational torque due to the first link's own weight is not generated, which makes it unnecessary to form a separate counterbalancing torque.

Then, when the first link 300 performs a pitch motion around the first joint $J_1$ to cause the first link 300 to form an angle of 90 degrees with respect to the ground surface, the first spring block (not shown) is changed in position to form a counterbalancing torque by means of the elastic forces of the first springs 438 and 448. Thus, as shown in FIG. 14(b), the counterbalancing torques are formed in the arrow directions around the first joint $J_1$ so that the required torque necessary for rotating the first link 300 can be minimized.

In this case, each of two first counterbalancers 400 disposed to form a pair halfway plays a role in compensating for, i.e., counterbalancing a gravitational torque due to the first link 300's own weight.

At this time, as shown in FIG. 21 in which the base link 200 is developed (see FIG. 15), the base reference part 223 forms a wound and retained structure through the first reference parts 412 and 422 and the parallelogram wires W (W1 and W2).

Reaction forces $F1\_R$ and $F1\_L$ as reaction forces to the counterbalancing torques are respectively formed in arrow directions with respect to each of the first reference parts 412 and 422, and two torques formed in the directions opposite to the formation directions of the reaction forces at the base reference part 223 so that the reaction forces and the torques are offset from each other. Thus, each of the first reference parts 412 and 422 does not rotate around the first joint $J_1$ but is maintained in position, and the base reference part 223 is maintained in position without rotation around the base joint $J_B$ due to formation of a separate torque.

Ultimately, by virtue of the counterbalancer and the curved parallelogram unit, gravity compensation for the first link 300 is achieved in a pitch motion of the first link 300, which is performed around the first joint $J_1$ as the pitch joint, or a separate yaw motion does not occur and a separate counterbalancing torque is not formed around the base joint $J_B$ as the yaw joint so that the base link 200 maintains a stable state without rotation.

(Mathematical Expression-Based Analysis of Curved Parallelogram Unit)

Hereinafter, the operation of the curved parallelogram unit of the present invention will be described by way of the following mathematical expressions.

(Yaw-Pitch Two-Degree-of-Freedom Gravity Compensation)

Figure 22:
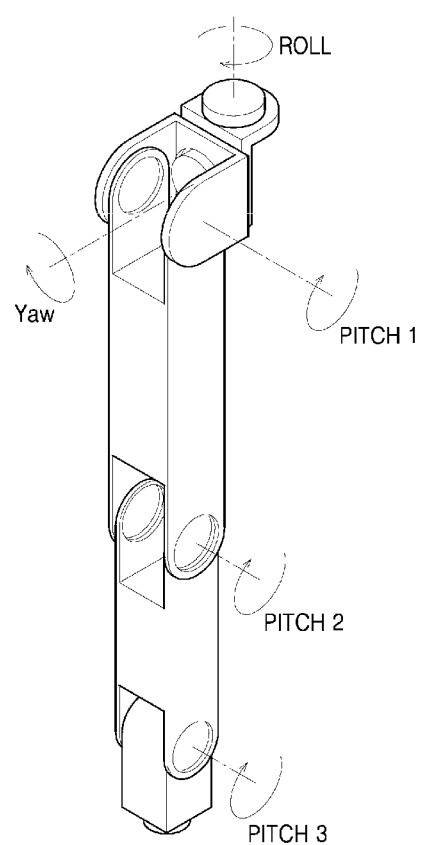
FIG. 22 is first link plate A partial perspective view showing a multi-degree-of-freedom, torque-free linkage device including a root link, a base link, and a first link according to an embodiment of the present invention.

First, the operation of the curved parallelogram unit will be described centering on the multi-degree-of-freedom, torque-free linkage device shown in FIG. 22.

In this case, the root link 100 may perform a roll motion around a root joint formed by the root link under the circumstances, but no gravitational torque is applied to the root joint $J_R$ and the counterbalancer is arranged to form a pair.

Figure 23:
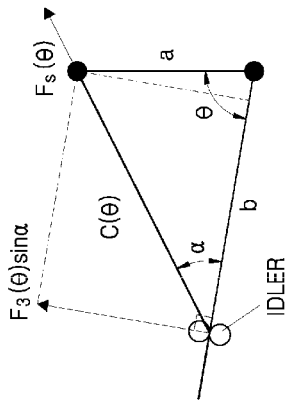
FIG. 23 shows a schematic configuration diagram of a first link to a first counterbalancer based on the center of a first joint $J_1$ and an enlarged view of a geometrical relationship between a connection point between the center O and a first reference part and a connection point between a counter wire We and the first reference part.
Figure 23:
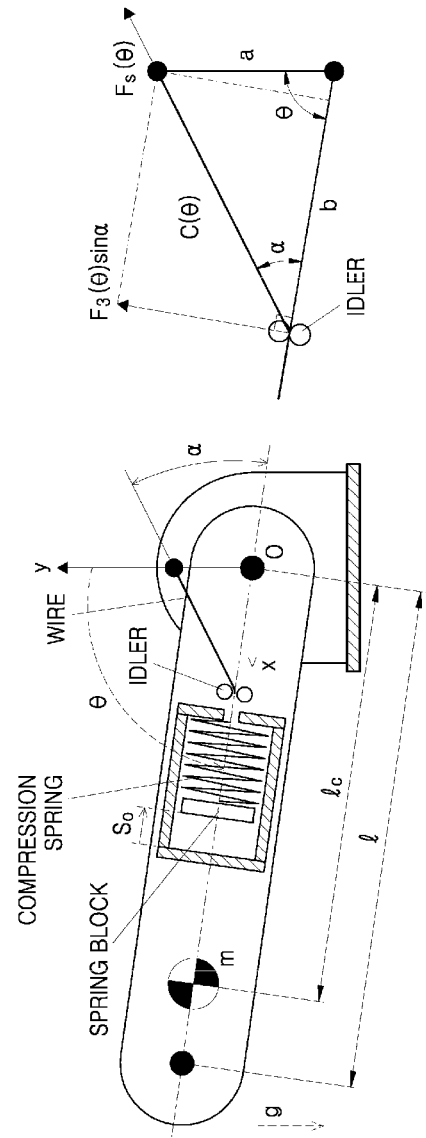

As shown in FIG. 23, it has been assumed that the counterbalancer is of a wire-type and is provided at the first joint $J_1$ for the sake of an easier understanding, but the counterbalancer of the present invention may take a slider-crank structure.

FIG. 23(a) shows a schematic configuration diagram of the first link to the first counterbalancer based on the center O of the first joint $J_1$ and FIG. 23(b) shows an enlarged view of a geometrical relationship between a connection point between the center O and the first reference part and a connection point between the counter wire We and the first reference part.

Each of the first counterbalancers disposed at the first joint forms the following gravity compensation torque.

In general, as shown in FIG. 23, when a gravity compensation or counterbalancing mechanism using a spring having a rigidity k and an initial compression length $s_o$ is applied to a robot arm having a mass M and a moment arm length $l_c$, a torque $T_g$ due to gravity applied to the robot arm is as follows:

$T_g = mgl_c \sin \theta$.

In addition, a spring force $F_s$ and a counterbalancing torque $T_c$ are respectively calculated as follows:

$F_s(\theta) = k\{s_o + c(\theta) - (b-a)\}$ $T_c(\theta) = bF_s(\theta) \sin \alpha, \sin \alpha = a \sin \theta/c$.

Thus, the counterbalancing torque $T_c$ can be represented from the above expression as follows:

$$T_c(\theta) = bk\{s_0 + c(\theta) - (b-a)\}\frac{a\sin\theta}{c(\theta)}.$$

At this time, it is assumed that S0=b−a, the above expression is represented as follows:

$T_c(\theta) = abk \sin \theta$.

In case of the present invention, a first reference plane arranged at the first joint rotates by the rotation of the base joint $J_B$ as the yaw joint and the fixed point of the counter wire is also changed, unlike the conventional gravity compensation mechanism in which a fixed point of the counter wire always a constant angle with the ground surface and takes into consideration only the rotational angle (θ) of the first joint as the pitch joint.

In this case, when the rotational angle of the first joint as the pitch joint is expressed as Op, the counterbalancing torques generated at the respective counterbalancers can be expressed as follows depending on the rotational direction:

$T_{c\_cw}(\theta) = abk \sin(\theta_p + \theta_y)$ $T_{c\_ccw}(\theta) = abk \sin(\theta_p - \theta_y)$.

The above expression can be represented as follows according to the law of sines:

$$T_{c\_cw}(\theta_p, \theta_y) = abk\{\sin\theta_p \cos\theta_y + \sin\theta_y \cos\theta_p\}$$

$$T_{c\_ccw}(\theta_p, \theta_y) = abk\{\sin\theta_p \cos\theta_y - \sin\theta_y \cos\theta_p\}.$$

In addition, when a mass at the center of gravity of the first link 300 is m, the acceleration of gravity is g, a length of the first link 300 is l, and a length from the center of rotation to the center of gravity is lc, the gravitational torques applied to the first joint $J_1$ as the pitch joint and the base joint $J_B$ as the yaw joint according to the posture of the link of the linkage device can be represented as follows:

$$T_{g\_yaw}(\theta) = mgl_c \sin\theta_y \cos\theta_p$$

$$T_{g\_pitch}(\theta) = mgl_c \cos\theta_y \sin\theta_p.$$

In this case, the gravitational torque $T_{g\_pitch}$ applied to the first joint $J_1$ as the pitch joint can be offset by the sum of terms including $\sin\theta_p \cos\theta_y$ in the two counterbalancing torques $T_{c\_cw}$ and $T_{c\_ccw}$ as are calculated above.

Thus, the following relationship is satisfied:

$$T_{g\_pitch}(\theta) = mgl_c \cos\theta_y \sin\theta_p = 2abk \sin\theta_p \cos\theta_y.$$

Therefore, a, b and k for the production of an appropriate counterbalancing torque can selected from the relationship $mgl_c = 2abk$. (12:00)

Figure 24:
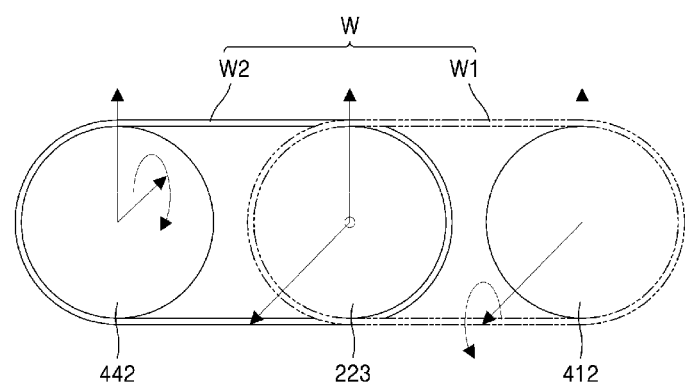
FIG. 24 is a conceptual view showing the development of FIG. 23.
Figure 25:
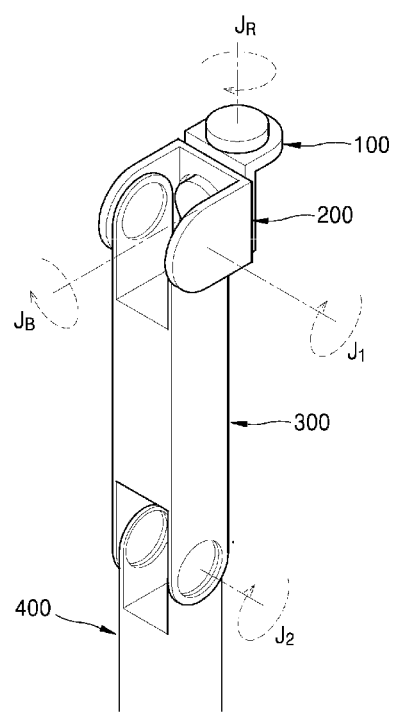
FIGS. 25 and 26 are partial perspective views showing a multi-degree-of-freedom, torque-free linkage device including a root link, a base link, a first link, and a second link according to an embodiment of the present invention.
Figure 26:
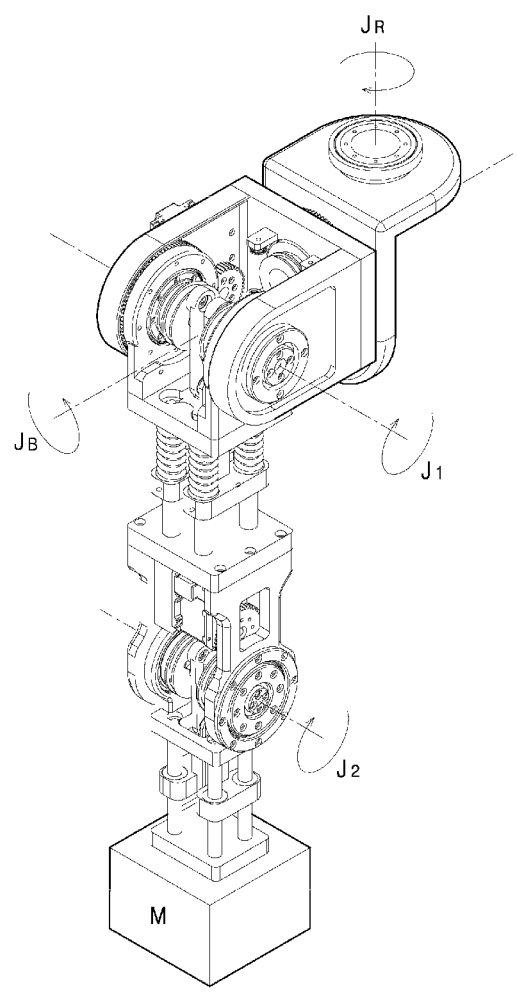

At this time, as shown in FIGS. 12 and 24, the reference planes $R_{Pl\_L}$ and $R_{Pa\_R}$ of the first reference parts 412 and 422 of the first joint $J_1$ as the pitch point are connected to the reference plane $R_{Pl}$ and the parallelogram wire, and thus a term remained after compensating for the first joint $J_1$ as the pitch point is added as follows so that the gravitational torque $T_{g\_yaw}$ applied to the base joint $J_B$ as the pitch joint can be counterbalanced.

The torques are opposite to each other in the "⊏"-shaped arrangement structure unlike the state in which a reference axis is developed as shown in FIG. 24. Thus, when the torques are added up, the sign is reversed as follows:

$$T_{g\_yaw}(\theta) = mgl_c \sin\theta_y \cos\theta_p = abk \sin\theta_y \cos\theta_p - (-abk \sin\theta_y \cos\theta_p) = 2abk \sin\theta_y \cos\theta_p$$

Thus, the relationship $mglc=2abk$ is established similar to the first joint $J_1$ as the pitch joint upon the compensation for the base joint $J_B$ as the yaw joint from the above expression.

Therefore, it is possible to implement a multi-degree-of-freedom gravity compensation device that can appropriately counterbalance the gravitational torque generated in response to the rotation of the yaw joint ($\theta y$) and the pitch joint ($\theta p$) through the selected design variables a, b and k.

(Yaw-Pitch-Pitch Three-Degree-of-Freedom Gravity Compensation)

In addition, if the present invention is applied to a manipulator configured as a four-degree-of-freedom mechanism consisting of a roll (root joint), a yaw (base joint), a pitch (first joint), and a pitch (second joint), the second pitch (second joint) enables gravity compensation in the same manner as that of the first pitch joint (second joint). A process of demonstrating this gravity compensation using mathematical expressions is as follows.

For the sake of an easier understanding, it is assumed that design variables a1, b1, k1 are applied to a gravity compensation device 400 (CBM1_L and CBM1_R) mounted at a first joint $J_1$ as pitch joint 1 and design variables a2, b2, k2 are applied to a gravity compensation device 600 (CBM2_L and CBM2_R) mounted at a second joint $J_2$ as pitch joint 2, the rotational angles of a base joint $J_B$ as a yaw joint, the first joint $J_1$ as the pitch joint 1, and the second joint $J_2$ as the pitch joint 2 are denoted by $\theta y$, $\theta p1$ and $\theta p2$, respectively.

In the case of the linkage device implemented as a four-degree-of-freedom robot arm, the following gravitational torques are applied to the base joint $J_B$ as the yaw joint, the first joint $J_1$ as the pitch joint 1, and the second joint $J_2$ as the pitch joint 2, respectively:

$$T_{g\_pitch1}(\theta_{p1}, \theta_{p2}, \theta_y) = m_1 g l_{c1} \sin\theta_{p1} \cos\theta_y + m_2 g\{l_1 \sin\theta_{p1} + l_{c2}\sin(\theta_{p1}+\theta_{p2})\}\cos\theta_y$$
$$= (m_1 g l_{c1} + m_2 g l_1)\sin\theta_{p1}\cos\theta_y + m_2 g l_{c2} \sin(\theta_{p1}+\theta_{p2})\cos\theta_y$$

$$T_{g\_pitch2}(\theta_{p1}, \theta_{p2}, \theta_y) = m_2 g l_{c2} \cos\theta_y \sin(\theta_{p1}+\theta_{p2})$$

$$T_{g\_yaw}(\theta_{p1}, \theta_{p2}, \theta_y) = m_1 g l_{c1} \cos\theta_{p1} \sin\theta_y + m_2 g\{l_1 \cos\theta_{p1} + l_{c2}\cos(\theta_{p1}+\theta_{p2})\}\sin\theta_y$$
$$= (m_1 g l_{c1} + m_2 g l_1)\cos\theta_{p1}\sin\theta_y + m_2 g l_{c2} \cos(\theta_{p1}+\theta_{p2})\sin\theta_y$$

In addition, the following gravity compensation or counterbalancing torques are generated from the respective first and second counterbalancers mounted at the first joint $J_1$ and the second joint $J_2$:

$$T_{c1\_cw}(\theta_{p1},\theta_{p2},\theta_y) = a_1 b_1 k_1 \{\sin\theta_{p1} \cos\theta_y - \sin\theta_y \cos\theta_{p1}\}$$

$$T_{c1\_ccw}(\theta_{p1},\theta_{p2},\theta_y) = a_1 b_1 k_1 \{\sin\theta_{p1} \cos\theta_y - \sin\theta_y \cos\theta_{p1}\}$$

$$T_{c2\_cw}(\theta_{p1},\theta_{p2},\theta_y) = a_2 b_2 k_2 \{\sin(\theta_{p1}+\theta_{p2})\cos\theta_y + \sin\theta_y \cos(\theta_{p1}+\theta_{p2})\}$$

$$T_{c2\_ccw}(\theta_{p1},\theta_{p2},\theta_y) = a_2 b_2 k_2 \{\sin(\theta_{p1}+\theta_{p2})\cos\theta_y - \sin\theta_y \cos(\theta_{p1}+\theta_{p2})\}$$

Therefore, the gravitational torque applied to the second joint $J_2$ can be counterbalanced by the sum of the terms including $\cos\theta y \sin(\theta p1+\theta p2)$ of $T_{c2\_cw}$ and $T_{c2\_ccw}$ generated from the second counterbalancer 600 as a gravity compensation mechanism.

Thus, the following relationship is established:

$$m_2 g l_{c2} \cos\theta_y \sin(\theta_{p1}+\theta_{p2}) = 2 a_2 b_2 k_2 \sin(\theta_{p1}+\theta_{p2})\cos\theta_y$$

Therefore, as in the counterbalancing of the first joint $J_1$ as the pitch joint 1, $a_2$, $b_2$ and $k_2$ for the generation of a proper counterbalancing torque can be selected from the following relationship: $m_2 g l_{c2} = 2 a_2 b_2 k_2$.

When the pitch-pitch joints are connected to each other by a double parallelogram mechanism, a portion of the gravitational torque applied to the pitch joint 2 as the second joint $J_2$) is already counterbalanced by the second counterbalance.

Since only $(m_1 g l_{c1} + m_2 g l_1)\sin\theta_{p1} \cos\theta_y$ of the gravitational torque applied to the first joint $J_1$ as the pitch joint 1 is required to be counterbalanced, it can be counterbalanced by the sum of the terms including $\sin\theta_{p1} \cos\theta_y$ of the counterbalancing torque generated from the first counterbalancer as in the second joint $J_2$ as the pitch joint 2.

Thus, the following relationship is established:

$$(m_1 g l_{c1} + m_c g l_1)\sin\theta_{p1}\cos\theta_y = a_1 b_1 k_1 \sin\theta_{p1}\cos\theta_y$$

Therefore, as in the counterbalancing of the other pitch joint, $a_1$, $b_1$ and $k_1$ for the generation of a proper counterbalancing torque can be selected from the following relationship: $m_1 g l_{c1} = 2 a_1 b_1 k_1$.

In addition, the remaining terms after counterbalancing the gravitational torques applied to the respective pitch joints as the first joint and the second joint compensates for, i.e., counterbalances the gravitational torque applied to the yaw joint as the base joint by addition by FIG. 23 as in the counterbalancing at the yaw joint of the above three-degree-of-freedom mechanism.

$$\begin{aligned} T_{g\_yaw}(\theta_{p1}, \theta_{p2}, \theta_y) &= (m_1 g l_{c1} + m_2 g l_1)\cos\theta_{p1}\sin\theta_y + \\ &\quad m_2 g l_{c2}\cos(\theta_{p1} + \theta_{p2})\sin\theta_y \\ &= \{a_1 b_1 k_1 \sin\theta_y \cos\theta_{p1} - (-a_1 b_1 k_1 \sin\theta_y \cos\theta_{p1})\} + \\ &\quad \left\{ \begin{array}{l} a_2 b_2 k_2 \sin\theta_y \cos(\theta_{p1} + \theta_{p2}) - \\ (-a_2 b_2 k_2 \sin\theta_y \cos(\theta_{p1} + \theta_{p2})) \end{array} \right\} \\ &= 2a_1 b_1 k_1 \sin\theta_y \cos\theta_{p1} + 2a_2 b_2 k_2 \sin\theta_y \cos(\theta_{p1} + \theta_{p2}) \end{aligned}$$

Therefore, as described above, respective design variables are set from the following relationship at the respective counterbalancers so that a counterbalancer can be designed which counterbalances the gravitational torques applied to the first and second joints as the pitch joints as well as the base joint as the yaw joint: $(m_1 g l_{c1} + m_2 g l_1) = 2a_1 b_1 k_1$ and $m_2 g l_{c2} = 2a_2 b_2 k_2$.

Hereinafter, a multi-degree-of-freedom, torque-free linkage device including a curved parallelogram unit and a counterbalancer of the present invention will be described centering on an actual embodiment of the present invention.

Figure 27:
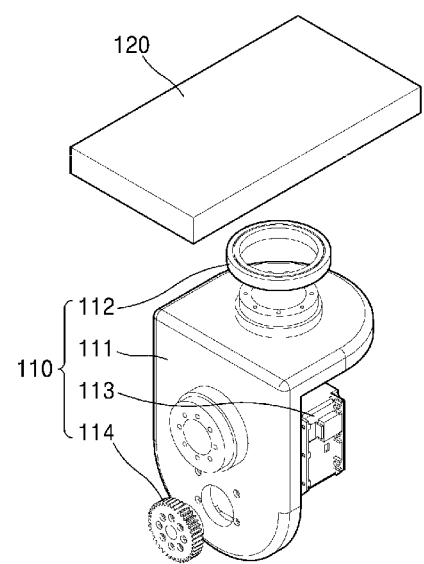
FIGS. 27 to 33 are detailed partial perspective views showing a multi-degree-of-freedom, torque-free linkage device according to an embodiment of the present invention.

A humanoid gravity compensation robot arm as shown in FIG. 27 has been implemented to demonstrate the performance of the curved parallelogram unit as a multi-parallelogram mechanism proposed by the present invention.

FIGS. 27 to 37 shows an example of a multi-degree-of-freedom, torque-free linkage device that includes a slider-crank mechanism type counterbalancer of the present invention as described above and a curved parallelogram unit of a wire-based curved arrangement structure and is implemented as a three-degree-of-freedom gravity compensation robot arm.

As described above, the multi-degree-of-freedom, torque-free linkage device of the present invention may take a structure in which the curved parallelogram unit is combined with the wire type counterbalancer, but the present invention will be described hereinafter centering on a structure in which the curved parallelogram unit is combined with the slider-crank based counterbalancer.

The slider-crank-based counterbalancer has been applied to the multi-degree-of-freedom, torque-free linkage device as the gravity compensation robot arm developed by the present inventors for the sake of improvement of the durability and reliability.

The multi-degree-of-freedom, torque-free linkage device as the robot arm includes a compound joint structure consisting of four joints, i.e., a roll joint (roll), a base joint (yaw), a first joint (pitch 1), and a second joint (pitch 2) as shown in FIG. 27.

The counterbalancer and the curved parallelogram unit of the multi-degree-of-freedom, torque-free linkage device as a robot arm has a structure in which they are arranged to form a pair so that two reference unit having a reference plane is present at each of the joints, the two reference units being connected to each other by means of a wire to form a curved parallelogram unit as a multi-parallelogram mechanism, i.e., a combination of two parallelogram mechanisms, and two slider-crank based counterbalancer are mounted at each joint.

The multi-degree-of-freedom, torque-free linkage device of the present invention counterbalances most of gravitational torques, leading to a remarkable reduction in the torque necessary to drive the multi-degree-of-freedom, torque-free linkage device as the robot arm.

Thus, the multi-degree-of-freedom, torque-free linkage device of the present invention can be driven through a very low capacity actuator module, and can implement an operation with more improved rapidity and accuracy when an actuator having the same capacity compared to a conventional one.

In the design shown in FIG. 27, it is assumed that a weight kit having a weight of 2 kg is mounted to take into consideration a mass of less than that of a robot wrist joint.

Hereinafter, the configuration and operation principle of the multi-degree-of-freedom gravity compensation device which has been developed by the present inventors will be described with reference to the accompanying drawings.

First, as described above, the multi-degree-of-freedom, torque-free linkage device 10 of the present invention 10 includes a root link 100, a base link 200, a first link 300, counterbalancers 400 and 600, and a curved parallelogram unit 700 (CPU).

The multi-degree-of-freedom, torque-free linkage device 10 may include a second link 500 under the circumstances, and may take a structure in which an end effector (not shown) that can be implemented as a roll motor or a gripper is further disposed at and end of the second link 500. In this embodiment, a description of the end effector will be omitted.

In addition, the multi-degree-of-freedom, torque-free linkage device of the present invention will be described hereinafter centering on a multi-axis, multi-degree of freedom structure.

However, the present invention can be configured in various manners without being limited to the number of the links, such as taking a single link structure.

Figure 28:
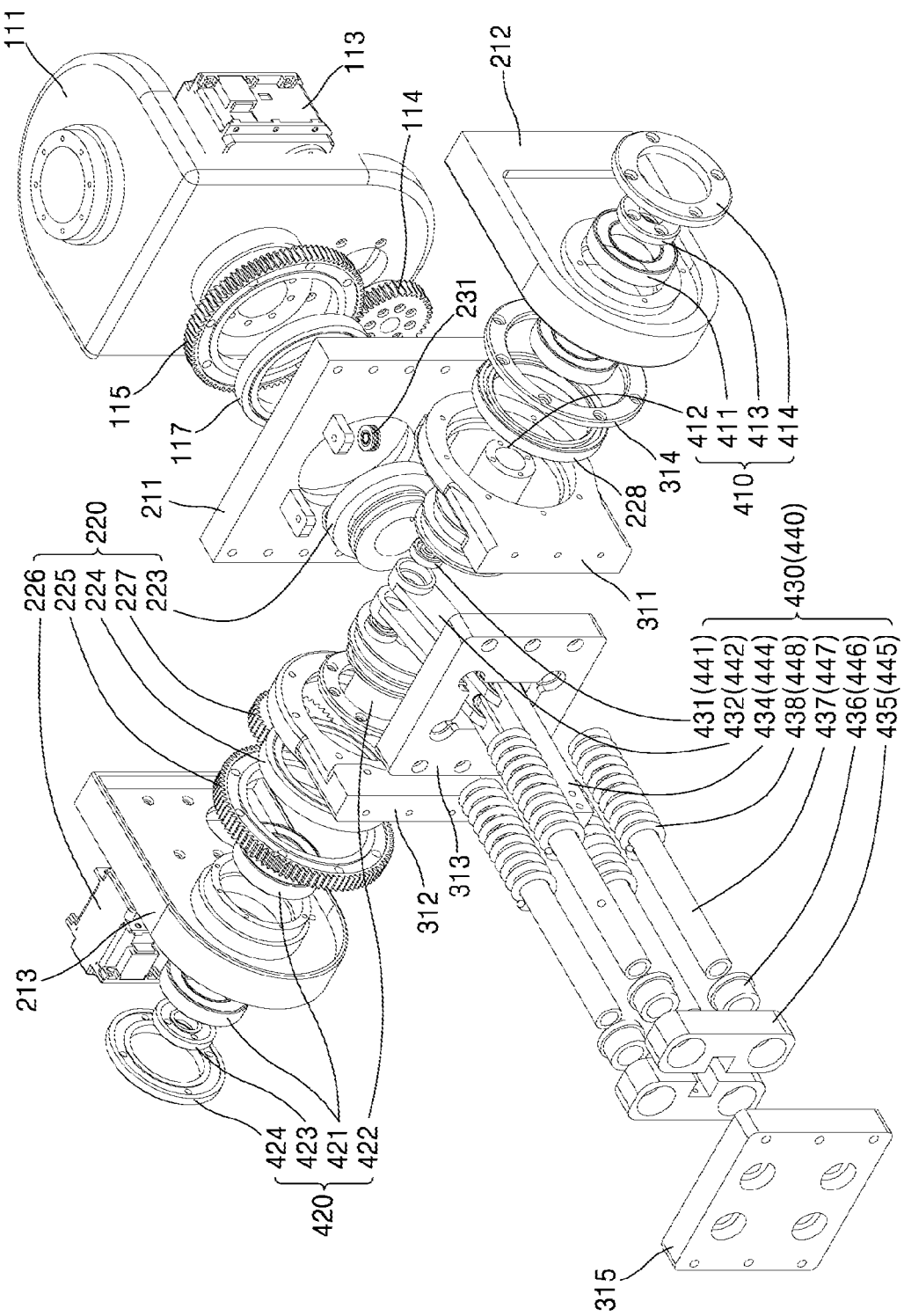

In FIGS. 27 and 28, specifically, the multi-degree-of-freedom, torque-free linkage device 10 of the present invention includes a root link 100, a base link 200, a first link 300, a second link 500, counterbalancers 400 and 600, and a curved parallelogram unit 700 (CPU).

A base joint $J_B$ is disposed between a root link 100 and a base link 200, a first link $J_1$ is disposed between the base link 200 and a first link 300, and a second link $J_2$ is disposed between the first link 300 and a second link 500.

The root link 100 can take a position fixed structure, but may further include a separate root joint $J_R$ that perpendicularly crosses the first joint $J_1$.

The root link 100 may form a state in which it rotates or translates around the root joint $J_R$.

The multi-degree-of-freedom, torque-free linkage device 10 according to this embodiment includes a counterbalancer of a slider-crank structure and a curved parallelogram unit of a bent structure.

Each of the counterbalancer and the curved parallelogram unit is provided in pair at the multi-degree-of-freedom, torque-free linkage device, and at least parts of a first counterbalancer of the counterbalancer and the curved parallelogram unit are disposed spaced along the longitudinal direction of the first joint.

A base reference part 223, first reference parts 412 and 422, and second reference parts 612 and 622 are respectively disposed at a base joint $J_B$ between a root link 100 and a base link 200, a first link $J_1$ between the base link 200 and a first link 300, and a second link $J_2$ between the first link 300 and a second link 500.

A first counterbalancer 400 is disposed at the first link 300.

A second counterbalancer 600 is disposed at the second link 500.

A wire-based curved parallelogram unit is disposed at the root link, the base link, the first link, and the second link.

First, the root link 100 is a basis of the multi-degree-of-freedom, torque-free linkage device as the entire robot, and simultaneously does not receive a gravitational torque with respect to the root joint $J_R$ perpendicular to the ground surface.

The root link 100 includes a root link frame 111 and a root link crossed roller bearing 112.

The root link frame 111 has a "]" shape, and the root link crossed roller bearing 112 is disposed at a portion of the root link frame 111, which is horizontal to the ground surface and is formed with the root joint $J_R$.

The root link 100 may perform a predetermined rotation operation around the root joint $J_R$, and can perform a translational motion in a state of being parallel to the ground surface.

A support part 120 is disposed in proximity to the root link frame 111 of the root link 100 so as to support the root link frame 111 in a relatively rotatable manner.

The root link crossed roller bearing 112 enables a smooth rotational operation between the root link frame 111 and the support part 120. The root link 100 forms the base joint base joint $J_B$ as a yaw joint together with the base link 200. An axis of the base joint $J_B$ is oriented horizontal to the ground surface.

In this embodiment, the root joint $J_R$ is arranged so as to orthogonally cross the base joint $J_B$. A root base drive unit 113, 114, 115 and 117 is partially disposed at the root link frame 111 so as to rotate the base link 200.

The root base drive unit (113, 114, 115 and 117) includes a root base actuator 113 and a root base link power transmission part (114, 115 and 117).

The root base link power transmission part (114, 115 and 117) is disposed between the root base actuator 113 and the base link 200 side so as to transmit a rotational force of the root base actuator 113 to the base link 200 side to form a relative rotation of the base link 200.

The root base link power transmission part 114, 115 and 117 includes a root base drive gear 114, a root base ring gear 115 (see FIG. 28), and a root base crossed roller bearing 117 (see FIG. 28)

The root base drive unit (113, 114, 115 and 117) can perform a yaw rotation motion around the base joint $J_B$ of the base link 200.

The root base actuator 113 is implemented as an electric motor, and the root base drive gear 114 is connected to a drive shaft of the root base actuator 113.

The root base ring gear 115 is fixedly mounted to the base link 200 so as to be meshed with the root base drive gear 114.

The root base crossed roller bearing 117 is insertingly disposed in a base link front frame 211 so that the root base crossed roller bearing can support a moment upon the rotation of the base link 200 around the base joint $J_B$ as the yaw joint.

The outer circumference of the root base crossed roller bearing 117 is connected to the root base ring gear 115 and the inner circumference thereof is connected to a base reference part 223 of a curved parallelogram unit (CPU) fixed mounted to the root link 100 so that when the base link 200 rotates relative to the root link 100, a smooth rotational operation can be performed between the root base ring gear 115 and the base reference part 223.

A predetermined gear ratio is formed between the root base drive gear 114 and the root base ring gear 115 so that a predetermined speed reduction function can be performed. The root base drive unit can be configured in various manners such as taking a structure in which a speed reducer is built in the root base actuator or a structure in which a separate speed reducer is connected to the root base actuator, if necessary.

The base link 200 has a "⊏" shape, is rotatably mounted to the root link 100, and forms the base joint $J_B$.

First reference parts 412 and 422 of the curved parallelogram unit (CPU) are rotatably mounted to the base link 200. The base link 200 includes a base link frame 210 and a base first link drive unit 220.

The base link frame 210 includes a base link front frame 211 and base link side frames 212 and 213.

The base link side frames 212 and 213 are mounted at both ends of the base link front frame 211 to form a predetermined base link frame 210.

The base link front frame 211 has a through-hole formed therein.

The base reference part 223 is penetratingly disposed at the base link 200 through the through-hole so that the base reference part 223 is fixedly mounted to the base reference part 223 of the curved parallelogram unit (CPU).

A base first link side crossed roller bearing 224 is insertingly disposed in a right base link side frame 213 (based on when viewed from the root link) of the base link side frames 212 and 213 so as to achieve a smooth relative rotation between the right base link side frame 213 and a right first link side frame 312 of the first link 300 which will be described later.

Each of the base link side frames 212 and 213 has a through-hole formed therein so that a constituent element can be penetratingly disposed in the through-hole so as to achieve a connection with another constituent element of the base link or the first link.

In this embodiment, first link plate A part of the base first link drive unit 220 is disposed at the right base link side frame 213 (based on when viewed from the root link) of the base link 200

The base first link drive unit 220 includes a base first link actuator 226 and a base first link power transmission part (225 and 227).

The base first link power transmission part (225 and 227) is disposed between the base first link actuator 226 and the first link 300 side so as to transmit a rotational force of the base first link actuator 226 to the first link 300 side to form a relative rotation of the first link 300.

The base first link power transmission part (225 and 227) includes a base first link ring gear (225) 와 base first link drive gear 227.

The base first link drive unit 220 can perform a pitch rotation motion around the first joint $J_1$ of the first link 300.

The base first link actuator 226 is fixedly mounted to the outside of the right base link side frame 213.

The base first link drive gear 227 is connected to a drive shaft of the base first link actuator 226 penetratingly disposed in the right base link side frame 213.

The base first link ring gear 225 is fixedly mounted to the outside of the right first link side frame 312 and is meshed with the base first link drive gear 227.

By virtue of this configuration, the first link 300 can rotate relative to the base link 200.

In addition, first reference parts 412 and 422 of first reference part units 410 and 420 are rotatably mounted to the first joint defined by the base link side frames 212 and 213 and first link base joint connection parts 311 and 312 so as to form a reference plane for the counterbalancers 400 and 600 and the curved parallelogram unit.

To this end, base angular contact bearings 411 and 421 are insertingly interposed between the base link side frames 212 and 213 in a double row, and when a wire is absent which connects to the base angular contact bearings 411 and 421, the first reference parts 412 and 422 implemented as pulleys are mounted in a structure in which they can freely rotate around the first joint $J_1$.

The first reference parts 412 and 422 are engaged with bearing flanges 413 and 423 after passing through the inner rings of the base angular contact bearings 411 and 421. Base pressing flanges 412 and 424 are engaged at the inside and/or outside of the base link side frames 212 and 213 so that outer rings of the base angular contact bearings 411 and 421 can be mounted to the base link side frames 212 and 213.

The first link 300 is connected at one end thereof to the base link 200 to form the first joint $J_1$ that crosses base joint $J_B$, and the center of gravity is spaced apart from the first joint $J_1$ along the longitudinal direction of the first link 300.

The first link 300 includes a first link plate (311, 312, 313 and 315), a first link shaft (437 and 447), and a first link second link drive unit 320.

The first link plate (311, 312, 313, 315, 316 and 317) includes a first link plate A part 313 and a first link plate B part 315.

The first link plate A part 313 and the first link plate B part 315 of the first link plate (311, 312, 313, 315, 316 and 317) are arranged to opposed to each other in such a manner that a first spring block (435 and 445) and a first spring (438 and 448) of the first counterbalancer 400 which are formed in pair are interposed between the first link plate A part 313 and the first link plate B part 315.

The first link plate A part 313 of the first link plate (311, 312, 313 and 315) is disposed between the first reference parts 412 and 422 rotatably mounted to the base link 200 and the first spring (438 and 448).

The first link plate B part 315 is disposed in such a manner that a first spring block (435 and 445) is interposed between the first link plate B part 315 and the first spring (438 and 448).

Disposed at the first link plate A part 313 is first link base joint connection parts 311 and 312 that are connected to the base link side frames 212 and 213 to form the first joint $J_1$.

Disposed at the first link plate B part 315 are first link second link connection parts 316 and 317 that are connected to the second link 500 to form the second joint $J_2$.

First link shafts 437 and 447 are disposed between the first link plate A part 313 and the first link plate B part 315 which are arranged spaced apart from each other.

The first link shafts 437 and 447 serve to interconnect the first link plate A part 313 and the first link plate B part 315.

The first link shafts 437 and 447 are implemented as hollow shafts, and enables a parallelogram wire as a parallelogram transmission part of the curved parallelogram unit to be penetratingly disposed in the first link shafts.

In other words, disposed at one end of the first link 300 are the first link base joint connection parts 311 and 312 that form the first joint $J_1$ together with the base link 200.

The first link base crossed roller bearing 224 is inserted between the right first link side frame 312 and the right base link side frame 213, which are disposed at the left side of the first link base joint connection part so that a moment applied to the multi-degree-of-freedom, torque-free linkage device implemented as a robot arm can be supported.

The base first link ring gear 225 fixed mounted to the outside of the right first link side frame 312 may serve as a pressing flange with respect to the first link base crossed roller bearing 224.

A left first link side frame 311 is connected to one side of the first link plate A part 313 of the first link plate (311, 312, 313 and 315) of the base link 200.

The other side of the first link plate A part 313 is connected to the right first link side frame 312.

The left first link side frame 311 is rotatably mounted to the left base link side frame 212 to form a portion of the first joint $J_1$.

A deep groove ball bearing 228 is inserted into the left first link side frame 311, and is fixed in position by a first link side bearing flange 314 and connected to the base link side frame 212.

The first link second link joint connection part (316 and 317) of the first link plate (311, 312, 313, 315, 316 and 317) is connected to the first link plate B part 315.

A right first link second link side frame 317 and a left first link second link side frame 316 of the first link second link joint connection part (316 and 317) define an inner space together with the first link plate B part 314 so that constituent elements for driving the second link 500 can be disposed therein.

The first link second link drive unit 320 is mounted in the inner space defined by the right first link second link side frame 317 and the left first link second link side frame 316 of the first link second link joint connection part (316 and 317) together with the first link plate B part 314

The first link second link drive unit 320 includes a first link second link actuator 323 and a first link second link power transmission part (321, 322, 324 and 325).

The first link second link power transmission part (321, 322, 324 and 325) is disposed between the first link second link actuator 323 and the second link 500 side so as to transmit a rotational force of the first link second link actuator 323 to the second link 500 to form a relative rotation of the second link 500 around the second joint $J_2$.

The first link second link power transmission part (321, 322,324,325) includes a first link second link ring gear 321 and a first link second link drive gear 324.

The first link second link drive unit 320 can perform a pitch rotation motion around a second joint $J_1$ of the second link 500.

The first link second link actuator 323 is fixedly mounted in a space defined by the right first link second link side frame 317, and the left first link second link side frame 316, and the first link plate B part 315.

The first link second link drive gear 324 is connected to a drive shaft of the first link second link actuator 323 penetratingly disposed in the right first link second link side frame 317, and the first link second link ring gear 321 is rotatably mounted to the left first link second link side frame 316.

In other words, a first link second link crossed roller bearing 322 is disposed at the left first link second link side frame 316.

An outer ring of the first link second link crossed roller bearing 322 is accommodated in the left first link second link side frame 316 to form a structure of being prevented from escaping from the left first link second link side frame 316 through a first link pressing flange 318, and the first link second link ring gear 324 is penetratingly disposed in an inner ring of the first link second link crossed roller bearing 322 to enable a smooth rotation of the first link second link ring gear 324 around the second joint.

Meanwhile, the first counterbalancer 400 of the counterbalancer is disposed at the first link 300.

The first counterbalancer 400 is disposed at one end thereof at a side of the first joint $J_1$ and disposed at the other end thereof along the longitudinal direction of the first link so that when the first link 300 moves relative to the root link 100, the first counterbalancer can perform gravity compensation on the first link 300.

The first counterbalancer 400 includes a first connecting rod (432 and 442), a first spring block (435 and 445), and a first spring (438 and 448), and may include a first rod block (434 and 444) and a first linear bushing (436 and 446), if necessary.

The first spring blocks 435 and 445 are arranged spaced apart from the first reference parts 412 and 422 disposed at the base link 200 so as to be movable along the longitudinal direction of the first link 300.

The first spring blocks 435 and 445 are penetratingly passed through by first link shafts 437 and 447 so that they can be slidably moved on the outer circumferences of the first link shafts.

The first link shafts 437 and 447 function to constitute a frame of the first link, and simultaneously guide the first spring blocks 435 and 445 and the first springs 438 and 448.

The first spring blocks 435 and 445 may further include first linear bushings 436 and 446 so as to guide a smooth movement of the first spring blocks 435 and 445 on the first link shafts 437 and 447.

The first connecting rods 432 and 442 are rotatably disposed at one ends thereof in such a manner as to be radially spaced apart from a rotation center for the first joint $J_1$ of the first reference parts 412 and 422 and are rotatably connected at the other ends thereof to the first spring blocks 435 and 445 side.

First rod bearings 411 and 421 are disposed between one ends of the first connecting rods 432 and 442 and the first reference parts 412 and 422 so that a smooth relative rotation can be performed between the first connecting rods 432 and 442 and the first reference parts 412 and 422.

By virtue of this structure, when the first link 300 rotates around the first join $J_1$ relative to the base link 200, the first spring blocks 435 and 445 slidably move on the first link shafts 437 and 447.

In the case of this embodiment, the first connecting rods 432 and 442 connected to the first reference parts 412 and 422 are penetratingly disposed in a through-hole formed in the base link front frame 211.

The first connecting rods 432 and 442 connected to the first reference parts 412 and 422 are penetratingly disposed in a through-hole formed in the base link front frame 211.

The first counterbalancer takes a structure in which the first connecting rods 432 and 442 are connected at the other ends thereof to the first rod blocks 434 and 444, and the first rod blocks 434 and 444 are connected to the first spring blocks 435 and 445, thereby preventing an interference with other constituent elements and enabling a smooth movement.

Figure 29:
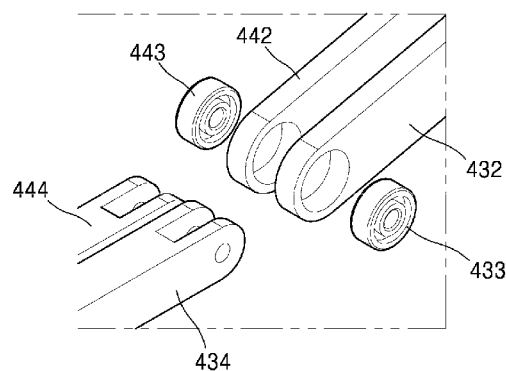

FIG. 29 shows a detailed partial view of a connection structure between the first connecting rods 432 and 442 and the first rod blocks 434 and 444.

First connecting rod bearings 433 and 443 are disposed at the connection portions between the first connecting rods 432 and 442 and the first rod blocks 434 and 444 to enable a smooth relative rotation therebetween.

The first springs 438 and 448 are implemented as compression coil springs and are disposed around the outer circumferences of the first link shafts 437 and the 447.

The first springs 438 and 448 are positioned between the first spring blocks 435 and 445 and the first reference parts 412 and 422 when viewed along the longitudinal direction of the first link 300, more specifically between the first spring blocks 435 and 445 and the base link front frame 211.

Figure 30:
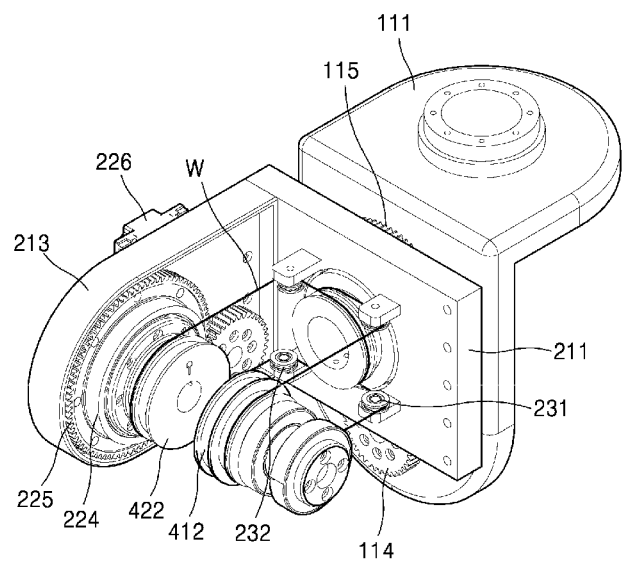

The curved parallelogram unit (CPU) takes a structure in which the base reference part 223 and the first reference parts 412 and 422, which are respectively disposed at the base joint $J_B$ and the first joint $J_1$ that are arranged to cross each other, are connected to each other by the parallelogram transmission part in a cooperative operation relation as shown in FIGS. 12 and 30.

The curved parallelogram unit (CPU) includes the base reference part 223, the first reference parts 412 and 422, and the parallelogram transmission part.

The base reference part 223 is securely fixed to the root link 100, and the first reference parts 412 and 422 are rotatably disposed at the first joint so as to be connected to the first connection rod of the first counterbalancer 400.

The parallelogram transmission part serves to interconnect the base reference part 223 and the first reference part 412 and 422, and forms a reference position for achieving a gravity compensation for another link such as the first link 300 or the second link 500, which is connected to the base link 200 by rotating the first reference parts 412 and 422 around the first joint $J_1$ when the base link 200 moves relative to the root link 100.

In this embodiment, the parallelogram transmission part is formed as a parallelogram wire W.

The parallelogram wire W as the parallelogram transmission part takes a structure in which one end of the parallelogram wire W is fixed to the base reference part 223 to surround the outer circumference of the base reference part 223 and then is surroundingly wound around the first reference parts 412 and 422.

A separate retaining part is formed at the base reference part 223 and the first reference parts 412 and 422 so that the wound parallelogram wire W can form a winding and retaining structure.

In addition, the parallelogram wire W takes a structure of forming a pair such that one of the parallelogram wires W is wound in a clockwise direction around the outer circumferences of the base reference part 223 and the first reference part 412 or 422 and the other of the parallelogram wires W is wound in a counterclockwise direction around the outer circumferences of the base reference part 223 and the first reference part 412 or 422. Thus, the parallelogram wire W can form a smooth cooperative operation structure regardless of the rotational direction of each link.

An idler pulley type parallelogram wire guide 232 is disposed at the base link front frame 211 of the base link 200.

The parallelogram wire guide 232 can guide the progress of the parallelogram wire W while coming into close contact with the parallelogram wire W.

In the present invention, the counterbalancer 400 or 600 and the curved parallelogram unit take a structure of forming a pair.

For example, an at least partial configuration of the first counterbalancer 400 and the curved parallelogram unit CPU is arranged to form a pair along the longitudinal direction of the first link such that the pairs of the first counterbalancer 400 and the curved parallelogram unit CPU form a structure of being slightly spaced apart from each other in a direction perpendicular to the longitudinal direction of the first link.

As described above, in the case where each of the first counterbalancer 400 and the curved parallelogram unit CPU is arranged to form a pair, the base reference part 223 may take a sequentially continuous arrangement structure for the base joint $J_B$ of an individual element and the base reference part forming a pair is formed as an integral single structure, if necessary. As such, the base reference part 223 may take a unitary configuration for superposedly arranged elements among the configurations forming a pair.

Although the prevent invention has been described centering on the root link 100, the base link 200, and the first link 300 in the above embodiment, it is not limited thereto.

In other words, the present invention may form a mufti-stage structure in which only a single link is not connected to the base link 200, but another link is continuously connected to the connected first link.

The second link considerably similar to the first link, and thus a redundant description thereof and a description will be made centering on a difference from the first link.

Figure 31:
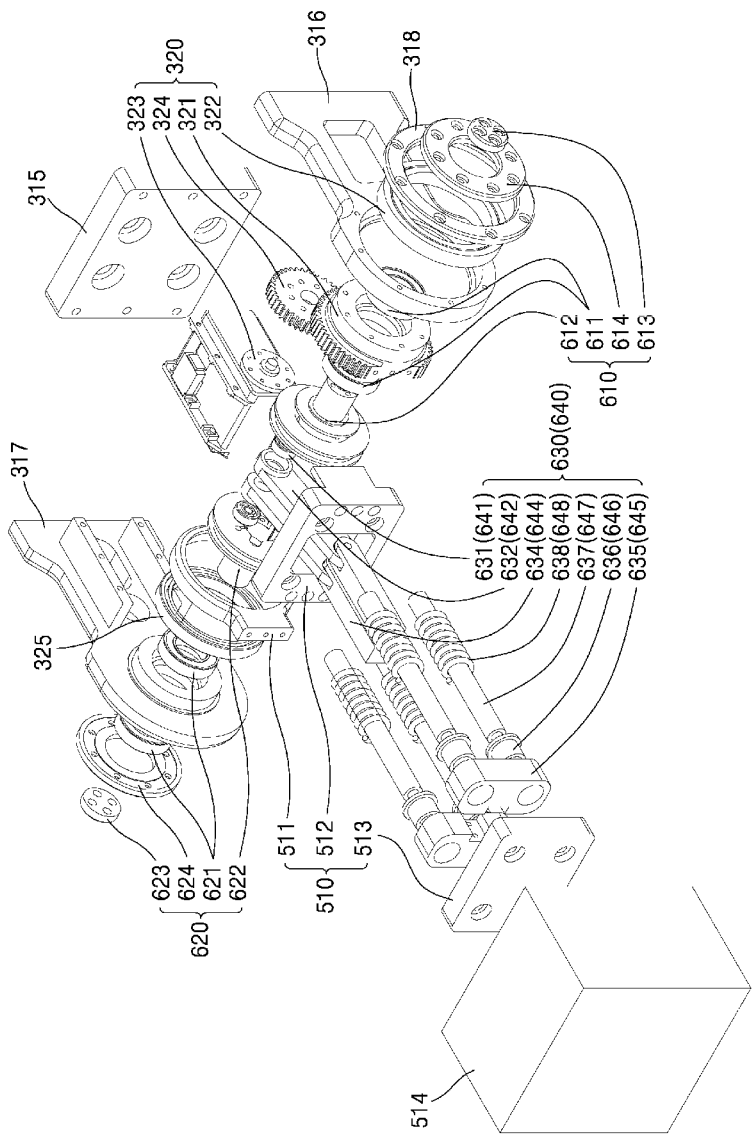
Figure 32:
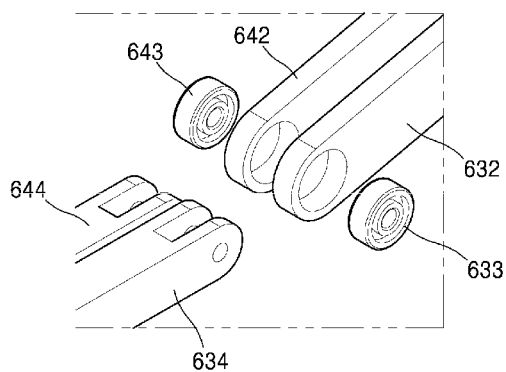
Figure 33:
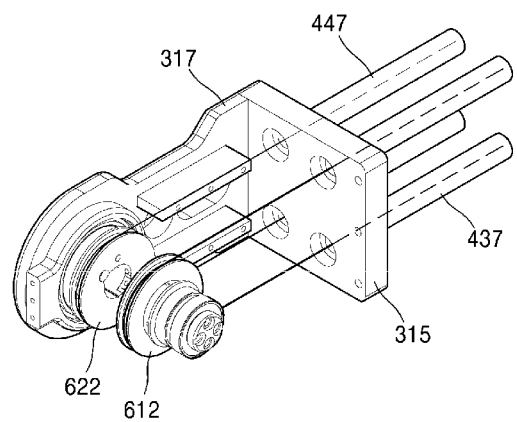

The second link 500 is connected at one end thereof to the first link second link joint connection parts 316 and 317 to form the second joint $J_2$ arranged in parallel with the first joint $J_1$, and the center of gravity is spaced apart from the second joint $J_2$ along the longitudinal direction of the second link 500 as shown in FIGS. 31 and 32.

The second link 500 includes a second link plate (511, 512 and 513) and a second link shaft (637 and 647).

The second link plate (511, 512 and 513) includes a second link plate A part 512 and a second link plate B part 513.

The second link plate A part 512 and the second link plate B part 513 of the second link plate (511,512,513) are arranged to be opposed to each other with the second spring blocks 635 and 645 and the second springs 638 and 648 of the second counterbalancer 600 arranged to form a pair interposed therebetween.

The second link plate A part 512 of the second link plate (511, 512 and 513) is disposed between the second reference parts 612 and 622 rotatably disposed at the first link 300 and the second spring 638 and 648.

The second link plate B part 513 is disposed in such a manner that the second spring blocks 635 and 645 are interposed between the second link plate B and the second springs 638 and 648.

A second link first link joint connection part 511 is disposed at the second link plate A part 512.

The second link first link joint connection part 511 forms the second joint $J_2$ together with the first link second link joint connection parts 316 and 317.

Second link shafts 637 and 647 are disposed between the second link plate A part 512 and the second link plate B part 513.

The second link shafts 637 and 647 serves to interconnect the second link plate A part 512 and the second link plate B part 513.

The second link shafts 637 and 647 are implemented as hollow shafts in this embodiment as in the foregoing, and allow the parallelogram wire as the parallelogram transmission part of the curved parallelogram unit to be penetratingly disposed therein.

That is, the second link first link joint connection part 511 is disposed at one end of the second link 500 so as to form the second joint $J_2$ together with the first link 300.

The second link first link joint connection part 511 forms the second joint $J_2$ together with the first link second link joint connection parts 316 and 317.

The first link second link joint connection parts 316 and 317 are connected to the first link plate B part 315.

As described above, it is obvious that The right first link second link side frame 317 and the left first link second link side frame 316 of the first link second link joint connection parts 316 and 317 define an inner space with the first link plate B part 315 so that constituent elements for driving the second link 500 can be disposed in the inner space.

A second link deep groove ball bearing 325 is insertingly connected between the second link first link joint connection part 511 and the right first link second link side frame 317 so as to additionally support a moment that can occur during the operation.

Meanwhile, the second counterbalancer 600 of the counterbalancer is disposed at the second link 500.

The second counterbalancer 600 is disposed at one end thereof at the second joint $J_2$ side and disposed at the other end thereof along the longitudinal direction of the second link 500 so that when the second link 500 rotates relative to an upper other link, gravity compensation can be performed on the second link 500.

The first counterbalancer 400 is disposed at one end thereof at a side of the first joint $J_1$ and disposed at the other end thereof along the longitudinal direction of the first link so that when the first link 300 moves relative to the root link 100, the first counterbalancer can perform gravity compensation on the first link 300.

The second counterbalancer 600 includes a second connecting rod (632 and 642), a second spring block (635 and 645), and a second spring (638 and 648), and may include a second rod block (634 and 644) and a second linear bushing (636 and 646), if necessary.

The second spring blocks 635 and 645 are arranged spaced apart from the second reference parts 612 and 622 rotatably disposed at an end of the second link 500, which forms the second joint, so as to be movable along the longitudinal direction of the second link 500.

The second spring blocks 635 and 645 are penetratingly passed through by second link shafts 637 and 647 so that they can be slidably moved on the outer circumferences of the second link shafts.

The second link shafts 637 and 647 function to constitute a frame of the second link, and simultaneously guide the second spring blocks 635 and 645 and the second springs 638 and 648.

The second spring blocks 635 and 645 may further include second linear bushings 436 and 446 so as to guide a smooth movement of the second spring blocks 635 and 645 on the second link shafts 637 and 647.

The second connecting rods 632 and 642 are rotatably disposed at one ends thereof in such a manner as to be radially spaced apart from a rotation center for the second joint $J_2$ of the second reference parts 612 and 622 and are rotatably connected at the other ends thereof to the second spring blocks 635 and 645 side.

Second rod bearings 631 and 641 are disposed between one ends of the second connecting rods 632 and 642 and the second reference parts 612 and 622 so that a smooth relative rotation can be performed between the second connecting rods 632 and 642 and the second reference parts 612 and 622.

By virtue of this structure, when the second link 500 rotates around the second join $J_2$ relative to the second reference parts 612 and 622, the second spring blocks 635 and 645 slidably move on the second link shafts 637 and 647.

In the case of this embodiment, the second connecting rods 632 and 642 connected to the second reference parts 612 and 622 are penetratingly disposed in a through-hole formed in the second link plate A part 512.

The second counterbalancer takes a structure in which the second connecting rods 632 and 642 are connected at the other ends thereof to the second rod blocks 634 and 644, and the second rod blocks 634 and 644 are connected to the second spring blocks 635 and 645, thereby preventing an interference with other constituent elements and enabling a smooth movement.

FIG. 32 shows a detailed partial view of a connection structure between the second connecting rods 632 and 642 and the second rod blocks 634 and 644.

Second connecting rod bearings 633 and 643 are disposed at the connection portions between the second connecting rods 632 and 642 and the second rod blocks 634 and 644 to enable a smooth relative rotation therebetween.

The second springs 638 and 648 are implemented as compression coil springs and are disposed around the outer circumferences of the second link shafts 637 and the 647 in such a manner as to be positioned between the second spring blocks 635 and 645 and the second reference parts 612 and 622 when viewed along the longitudinal direction of the second link 500, more specifically between the second spring blocks 635 and 645 and the second link plate A part 512.

The curved parallelogram unit (CPU) takes a structure in which the first reference parts 412 and 422 and the second reference parts 612 and 622, which are respectively disposed at the first joint $J_1$ and the second joint $J_2$ that are arranged in parallel with each other, are connected to each other by the parallelogram transmission part in a cooperative operation relation as shown in FIGS. 12, 28, 31 and 33.

The curved parallelogram unit (CPU) includes a base reference part 223, first reference parts 412 and 422, second reference parts 612 and the 622, and a parallelogram transmission part.

The first reference parts 412 and 422 are rotatably disposed at the first joint $J_1$ formed by the first link 300 and the base link 200.

The second reference parts 612 and 622 are rotatably disposed at the first joint $J_2$ to form a structure of being connected to the second connecting rods of the second counterbalancer 600.

The parallelogram transmission part serves to interconnect the first reference part 412 and 422 and the second reference parts 612 and 622, and forms a reference position for achieving a gravity compensation for another link by rotating the first reference parts 412 and 422 around the first joint $J_1$ when the second link 500 moves relative to the first link 300.

In this embodiment, the parallelogram transmission part is formed as a parallelogram wire W.

The parallelogram wire W as the parallelogram transmission part takes a structure in which one end of the parallelogram wire W is fixed to the first reference parts 412 and 422 to surround the outer circumference of the first reference parts 412 and 422 and then is surroundingly wound around the second reference parts 612 and 622.

A separate retaining part is formed at the first reference parts 412 and 422 and the second reference parts 612 and 622 so that the wound parallelogram wire W can form a winding and retaining structure.

In addition, the parallelogram wire W takes a structure of forming a pair such that one of the parallelogram wires W is wound in a clockwise direction around the outer circumferences of the first reference part 412 or 422 and the second reference part 612 or 622 and the other of the parallelogram wires W is wound in a counterclockwise direction around the outer circumferences of the first reference part 412 or 422 and the second reference part 612 or 622. Thus, the parallelogram wire W can form a smooth cooperative operation structure regardless of the rotational direction of each link.

In addition, the parallelogram wire W wound around the second reference part forms a winding and retaining structure in which the parallelogram wire W is wound around the base reference part and the first reference part, and may be modified in various manners, such as taking a structure in which the wire is extendingly arranged and a structure in which the wire is individually arranged based on each reference unit.

In the present invention, the counterbalancers 400 and 600 and the curved parallelogram unit have a structure of forming pairs.

For example, at least partial elements of the second counterbalancer 600 and the curved parallelogram unit are disposed to form a pair along the longitudinal direction of the first joint in such a manner as to be slightly spaced apart from each other in a direction perpendicular to the longitudinal direction of the second link between the elements that form a pair.

In addition, the second reference parts 612 and 622 of the second reference part units 610 and 620 are rotatably disposed at the second joint $J_2$ formed by the second link first link joint connection part 511 and the first link second link joint connection parts 316 and 317 so as to form a reference plane for the second counterbalancer 600 and the curved parallelogram unit of the counterbalancers 400 and 600.

To this end, the base angular contact bearings 611 and 621 are insertingly interposed between the second link first link joint connection part 511 and the right and left first link second link side frames 316 and 317 in a double row, and when a wire is absent which connects to the base angular contact bearings 611 and 621, the second reference parts 612 and 622 implemented as pulleys are mounted in a structure in which they can freely rotate around the first joint $J_1$.

The second reference parts 612 and 622 are engaged with bearing flanges 613 and 623 after passing through the inner rings of the base angular contact bearings 611 and 621.

Base pressing flanges 614 and 624 are engaged at the inside and/or outside of the base link side frames 212 and 213 so that outer rings of the base angular contact bearings 611 and 621 can be mounted to the second link first link joint connection part 511 and the left first link second link side frame 316.

In addition, although the present invention has been configured such that a weight kit having a weight of 2 kg is mounted at an end of the second link to take into consideration a mass of less than that of a robot wrist joint, it may be modified in various manners.

In the meantime, although not shown in FIGS. 28, 30 and 31, the second first counterbalancer further includes a rod adjustment unit that can adjust the connection positions that act as reference planes between the first reference part/the second reference part and the first connecting rod/the second connecting rod as mentioned upon the description of the principle of the counterbalancer of the present invention.

The rod adjustment unit includes an adjustment lead screw and an adjustment block.

The adjustment lead screw is disposed at the first reference part and the second reference part so as to be arranged radially from the centers of the first joint $J_1$ and the second joint $J_2$, and can be adjusted in rotation in the longitudinal direction thereof.

The adjustment block can be adjusted in position radially from the center of the first joint $J_1$ and the second joint $J_2$ along with the rotation of the adjustment lead screw along the longitudinal direction of the adjustment lead screw The rod adjustment unit may take a structure in which one ends of the first connecting rod and the second connecting rod are rotatably mounted.

In addition, the rod adjustment unit may take a structure in which a slit is formed along the longitudinal direction of the adjustment lead screw so as to guide the movement of the adjustment block.

FIGS. 34 to 37 show examples of the operation of the multi-degree-of-freedom, torque-free linkage device according to embodiments of the present invention.

Figure 34:
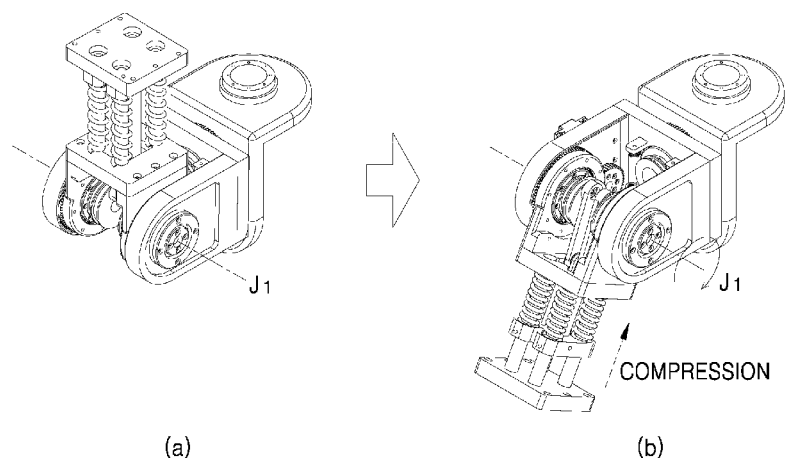
FIGS. 34 to 37 are perspective views showing the operation state of a multi-degree-of-freedom, torque-free linkage device according to an embodiment of the present invention.
Figure 35:
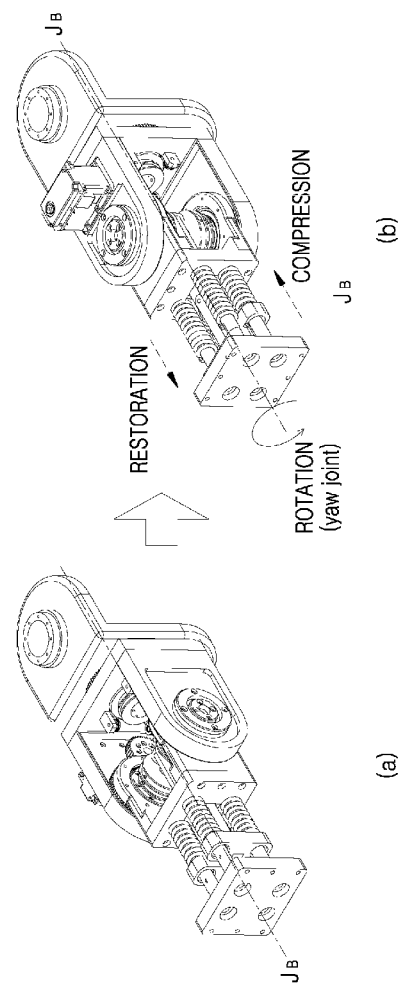

FIGS. 34 and 35 show examples of the multi-degree-of-freedom, torque-free linkage device including the root link, the base link, and the first link. In the case where a state is changed from FIG. 34(a) to FIG. 34(b) by the rotation of the first link around the first joint $J_1$, a change in the state of the first spring of the first counterbalance can be grasped.

In other words, in the case where the first link is oriented toward the top, the first spring forms a maximum tension state, but as the first link rotates toward the ground surface, it forms a compressed state due to the displacement of the first spring block.

In addition, in FIG. 35, when the base link performs a yaw motion around the base joint $J_B$ in a state in which the first link rotates by 90 degrees around the first joint so as to oriented horizontal to the ground surface, torques are formed due to forces applied to the first reference part in the opposite directions by the first counterbalancer formed in pair through the action of the curved parallelogram unit and a counterbalancing torque is not generated due to the counterbalancing due to the torques formed in the opposite directions at the base reference part. Thus, it can be seen from FIG. 35 that a pitch motion does not occur around the first joint $J_1$ as the pitch joint.

Figure 36:
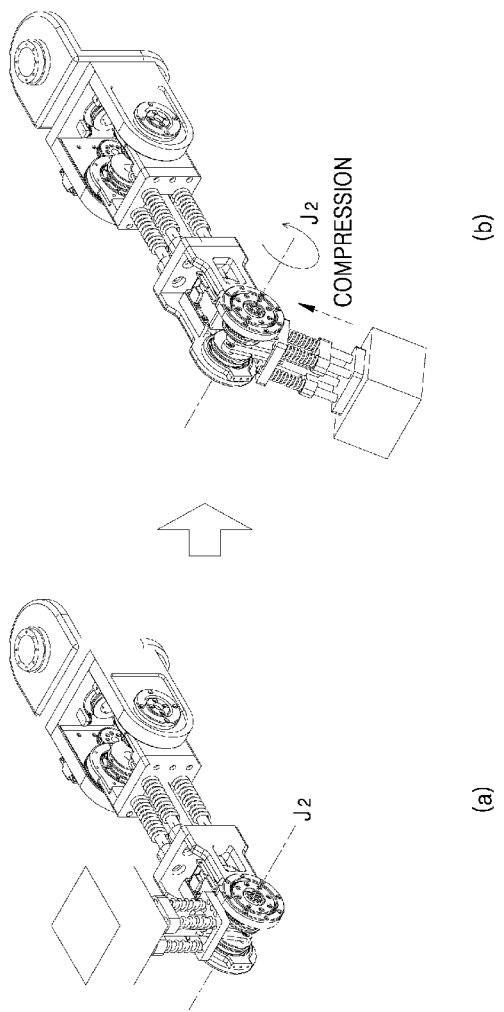
Figure 37:
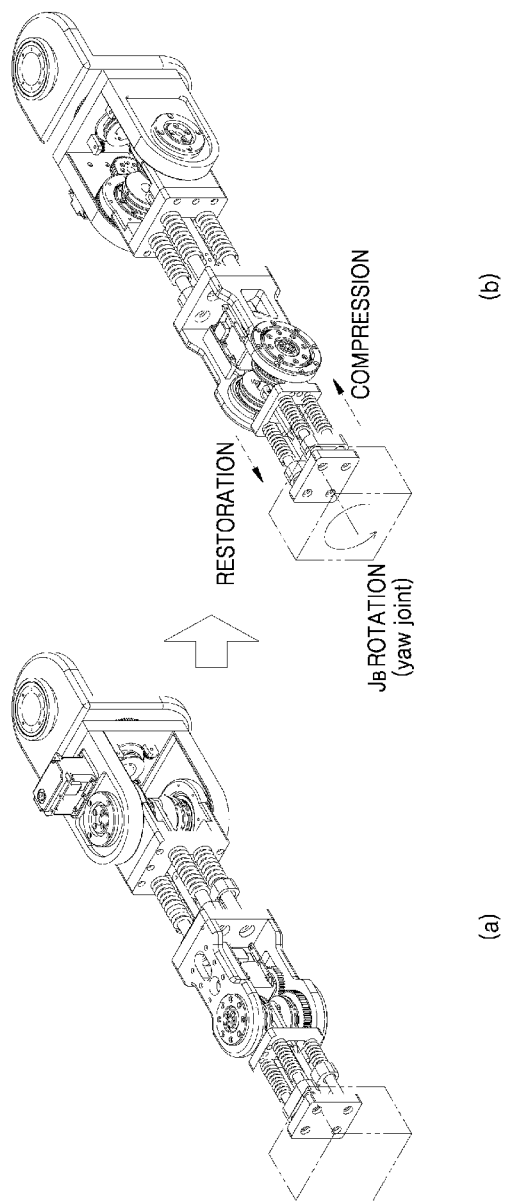

FIGS. 36 and 37 show examples of the arrangement structure of the base link, the first link, and the second link.

As shown in FIG. 36, a function of counterbalancing a gravitational torque due to a counterbalancing torque is performed even with respect to a predetermined self-weight of the second link through the second counterbalance disposed at the second link.

In FIG. 37, in the case where the base link rotates around the base joint $J_B$ das the yaw joint, predetermined torques due to a change in the position of the spring blocks of the second counterbalancer and the first counterbalance are formed in the directions opposite to each of the second reference part and the first reference part and are offset from each other at the base link. Thus, it can be seen from FIG. 37 that a pitch motion does not occur around the first joint $J_1$ and the second joint $J_2$ as the pitch joints.

The above embodiments are merely examples for explaining the present invention, and the present invention is not limited thereto.

The multi-degree-of-freedom, torque-free linkage device of the present invention can be used in various mechanical configurations for industrial or household purposes, such as a mechanical transfer device for transferring a home delivery object, a delivery object, baggage, and the like, a linkage support structure for a household monitor, or a linkage structure for medical facilities. In addition, the multi-degree-of-freedom, torque-free linkage device of the present invention may be modified in various manners within a range of including a curved parallelogram unit of a curved or bent arrangement structure, such as taking a mechanical structure which does not require an additional driving force as well as a structure in which a single link is arranged and a structure in which a plurality of consecutive links is arranged.

INDUSTRIAL APPLICABILITY

The multi-degree-of-freedom, torque-free linkage device of the present invention can be utilized in a wide range of applications, such as being applied to a robotic device for industrial, household, and medical purposes, a mechanical element that implements a gravity compensation function due to a predetermined self-weight of a link, etc.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical sprit of the appended claims.

The invention claimed is:

1. A multi-degree of freedom torque-free linkage device comprising:
   a root link;
   a base link rotatably connected to the root link to form a base joint;
   a first link connected at one end thereof to the base link to form a first joint that intersects the base joint, the center of gravity of the first link being positioned so as to be spaced apart from the first joint along the longitudinal direction thereof;
   a counterbalancer comprising a first counterbalancer disposed at the first link in such a manner as to be disposed at one end thereof at a side of the first joint and disposed at the other end thereof along the longitudinal direction of the first link so that when the first link moves relative to the root link, the first counterbalancer can perform gravity compensation on the first link; and
   a curved parallelogram unit comprising a base reference part securely fixed to the root link, a first reference part rotatably disposed at the first joint formed by the base link and the first link and connected to the first counterbalancer, and a parallelogram transmission part configured to connect the base reference part and the first reference part to each other and form a reference position for achieving a gravity compensation for another link connected to the base link by rotating the first reference part around the first joint when the base link moves relative to the root link.

2. The multi-degree of freedom torque-free linkage device according to claim 1, wherein each of the first counterbalancer and the curved parallelogram unit is provided in pair, and at least parts of the first counterbalancer and the curved parallelogram unit are disposed along the longitudinal direction of the first joint in such a manner as to be spaced apart from each other in a direction perpendicular to the longitudinal direction of the first joint.

3. The multi-degree of freedom torque-free linkage device according to claim 2, wherein the parallelogram transmission part is a parallelogram wire formed as a wire.

4. The multi-degree of freedom torque-free linkage device according to claim 3, wherein the parallelogram wire is fixed at one end thereof to the base reference part to surround the outer circumferences of the base reference part and the first reference part in this order so as to form a pair.

5. The multi-degree of freedom torque-free linkage device according to claim 4, wherein the curved parallelogram unit further comprises a parallelogram wire guide disposed at the base link in such a manner as to be interposed between the base reference part and the first reference part on a path of the parallelogram wire and configured to guide the progress of the parallelogram wire.

6. The multi-degree of freedom torque-free linkage device according to claim 5, wherein the base link is formed in a "⊏" shape, the first reference part is formed in pair such that the pair of the first reference parts confront each other and are spaced part from each other, and the base reference part is disposed to orthogonally cross the first reference part.

7. The multi-degree of freedom torque-free linkage device according to claim 4, wherein one of the parallelogram wires is wound in a clockwise direction around the outer circumferences of the base reference part and the first reference part and the other of the parallelogram wires is wound in a counterclockwise direction around the outer circumference of the base reference part and the first reference part.

8. The multi-degree of freedom torque-free linkage device according to claim 2, wherein the first counterbalancer comprises:
a first spring block disposed spaced apart from the first reference part disposed at the base link so as to be movable along the longitudinal direction of the first link;
a first connecting rod rotatably disposed at one end thereof in such a manner as to be radially spaced apart from a rotation center for the first joint of the first reference part and is rotatably connected at the other end thereof to the first spring block side so that the first spring block moves along with the relative rotation of the first link around the first joint; and
a first spring disposed the first spring block and the first reference part.

9. The multi-degree of freedom torque-free linkage device according to claim 8, wherein the first link comprises:
a first link plate comprising a first link plate A part and a first link plate B part that are arranged to be opposed to each other with the first spring block and the first spring interposed therebetween, the first link plate A part being disposed between the first reference part and the first spring, and the first link plate B part being disposed in such a manner that the first spring block is interposed between the first link plate B and the first spring; and
a first link shaft disposed between the first link plate A part and the first link plate B part of the first link plate, and
wherein the first connecting rod is penetratingly disposed in the first link plate A part of the first link plate, and the first spring is disposed on the outer circumference of the first link shaft along the longitudinal direction of the first link shaft.

10. The multi-degree of freedom torque-free linkage device according to claim 9, wherein the first counterbalancer comprises a first rod block disposed at one side of the first spring block so as to be oriented toward the first link plate A part in the movement direction of the first spring block, and is rotatably connected to the other end of the first connecting rod.

11. The multi-degree of freedom torque-free linkage device according to claim 8, wherein the first counterbalancer further comprises a rod adjustment unit configured to adjust the arrangement position of one end of the first connecting rod.

12. The multi-degree of freedom torque-free linkage device according to claim 11, wherein the rod adjustment unit comprises an adjustment lead screw and an adjustment block at the first reference part,
wherein the adjustment lead screw is disposed radially from the center of the first joint and is adjustable in rotation in the longitudinal direction thereof, and
wherein the adjustment block is adjustable in position radially from the center the first joint in response to the rotation of the adjustment lead screw along the longitudinal direction of the adjustment lead screw, and allows one end of the first connecting rod to be rotatably mounted thereon.

13. The multi-degree of freedom torque-free linkage device according to claim 2, wherein the root link comprises a root base drive unit configured to form a rotational force of the base link, and
wherein the root base drive unit comprises:
a root base actuator configured to create a rotational force around a rotary axis of the base joint; and
a root base link power transmission part disposed between the root base actuator and the base link side and configured to transmit the rotational force of the root base actuator to the base link side to form a relative rotation of the base link.

14. The multi-degree of freedom torque-free linkage device according to claim 13, wherein the root base link power transmission part comprises:
a root base drive gear connected to the root base actuator; and
a root base ring gear fixedly mounted to a side of the base link so as to be meshed with the root base drive gear.

15. The multi-degree of freedom torque-free linkage device according to claim 2, wherein the base link comprises a base first link drive unit configured to form a rotational force of the first link, and
wherein the base first link drive unit comprises:
a base first link actuator configured to generate a rotational force around a rotary axis oriented perpendicular to the longitudinal direction of the first link; and
a base first link power transmission part disposed between the base first link actuator and the first link side and configured to transmit the rotational force of the base first link actuator to the first link side to form a relative rotation of the first link.

16. The multi-degree of freedom torque-free linkage device according to claim 15, wherein the base first link power transmission part comprises:
a base first link drive gear connected to the base first link actuator; and
a base first link ring gear fixedly mounted to a side of the first link so as to be meshed with the base first link drive gear.

17. The multi-degree of freedom torque-free linkage device according to claim 2, further comprising a second link rotatably connected at one end thereof to the first link to form a second joint, the center of gravity of the second link being positioned so as to be spaced apart from the second joint along the longitudinal direction thereof,
wherein the second link comprises a second counterbalancer 600 disposed at one end thereof at the second joint side and disposed at the other end thereof along the longitudinal direction of the second link so that when the second link rotates around the second joint, gravity compensation can be performed on the second link, wherein the parallelogram transmission part is a parallelogram wire formed as a wire to form a pair, wherein the curved parallelogram unit further comprises a second reference part rotatably disposed at an end of the second link that forms the second joint, wherein after the parallelogram wire is surroundingly wound at one end thereof on the outer circumference of the first reference part and is retained on the first reference part, it extends along the longitudinal direction of the second link, and the parallelogram wire is surroundingly wound at the other end thereof on the outer circumference of the second reference part and is retained on the second reference part, and wherein one of the parallelogram wires is wound in a clockwise direction around the outer circumferences of the second reference part and the other of the parallelogram wires is wound in a counterclockwise direction around the outer circumference of the second reference part.

18. The multi-degree of freedom torque-free linkage device according to claim 17, wherein the second counter-balancer comprises:
- a second spring block arranged spaced apart from the second reference part rotatably disposed at an end of the second link, which forms the second joint, so as to be movable along the longitudinal direction of the second link;
- a second connecting rod rotatably disposed at one end thereof in such a manner as to be radially spaced apart from a rotation center for the second joint of the second reference part and is rotatably connected at the other end thereof to the second spring block side so that the second spring block moves along with the rotation of the second reference part; and
- a first spring disposed the second spring block and the second reference part.

19. The multi-degree of freedom torque-free linkage device according to claim 18, wherein the second link comprises:
- a second link plate comprising a second link plate A part and a second link plate B part that are arranged to be opposed to each other with the second spring block and the second spring interposed therebetween, the second link plate A part being disposed between the second reference part and the second spring, and the second link plate B part being disposed in such a manner that the second spring block is interposed between the second link plate B and the second spring; and
- a second link shaft disposed between the second link plate A part and the second link plate B part of the second link plate, and
wherein the second connecting rod is penetratingly disposed in the second link plate A part of the second link plate, and the second spring is disposed on the outer circumference of the second link shaft along the longitudinal direction of the second link shaft.

20. The multi-degree of freedom torque-free linkage device according to claim 19, wherein the second counter-balancer comprises a second rod block disposed at one side of the second spring block so as to be oriented toward the second link plate A part in the movement direction of the second spring block, and is rotatably connected to the other end of the first connecting rod.

* * * * *